(12) United States Patent
Jaroszczyk et al.

(10) Patent No.: US 7,323,106 B2
(45) Date of Patent: Jan. 29, 2008

(54) MULTI-ELEMENT FILTER WITH MULTIPLE PLEAT CHANNEL HEIGHT

(75) Inventors: Tadeusz Jaroszczyk, Stoughton, WI (US); Mark A. Terres, Stoughton, WI (US); Scott W. Schwartz, Fort Atkinson, WI (US); Eric A. Janikowski, Jefferson, WI (US); Jeffrey S. Morgan, Stoughton, WI (US); Barry M. Verdegan, Stoughton, WI (US); Scott P. Heckel, Stoughton, WI (US); Caryn J. Christianson, Stoughton, WI (US); Jerald J. Moy, Oregon, WI (US); Murray R. Schukar, Fitchburg, WI (US)

(73) Assignee: Fleetguard, Inc., Nashville, TN (US)

( * ) Notice: Subject to any disclaimer, the term of this patent is extended or adjusted under 35 U.S.C. 154(b) by 127 days.

(21) Appl. No.: 11/247,619

(22) Filed: Oct. 11, 2005

(65) Prior Publication Data
US 2007/0045167 A1   Mar. 1, 2007

Related U.S. Application Data

(63) Continuation-in-part of application No. 11/217,934, filed on Sep. 1, 2005.

(51) Int. Cl.
*B01D 29/07*   (2006.01)

(52) U.S. Cl. ............... 210/493.1; 210/315; 210/338; 210/342; 210/493.5; 210/487; 55/486; 55/489

(58) Field of Classification Search ............. None
See application file for complete search history.

(56) References Cited

U.S. PATENT DOCUMENTS

| | | | | |
|---|---|---|---|---|
| 3,420,377 A * | 1/1969 | Vandersip | ............... | 210/342 |
| 5,824,232 A * | 10/1998 | Asher et al. | ............. | 210/493.5 |
| 6,149,700 A | 11/2000 | Morgan et al. | | |
| 6,261,334 B1 | 7/2001 | Morgan et al. | | |
| 6,306,193 B1 | 10/2001 | Morgan et al. | | |
| 6,375,700 B1 | 4/2002 | Jaroszczyk et al. | | |
| 6,383,244 B1 | 5/2002 | Wake et al. | | |
| 6,391,076 B1 | 5/2002 | Jaroszczyk et al. | | |
| 6,416,561 B1 | 7/2002 | Kallsen et al. | | |
| 6,482,247 B2 | 11/2002 | Jaroszczyk et al. | | |
| 6,511,599 B2 | 1/2003 | Jaroszczyk et al. | | |
| 6,569,330 B1 * | 5/2003 | Sprenger et al. | ............ | 210/315 |
| 6,641,637 B2 | 11/2003 | Kallsen et al. | | |
| 6,962,660 B2 * | 11/2005 | Wybo | ............ | 210/315 |
| 7,014,761 B2 * | 3/2006 | Merritt et al. | ............. | 210/342 |

FOREIGN PATENT DOCUMENTS

JP           02207807      *   8/1990

* cited by examiner

*Primary Examiner*—Krishnan Menon
*Assistant Examiner*—Madeline Gonzalez
(74) *Attorney, Agent, or Firm*—Andrus, Sceales, Starke & Sawall, LLP; J. Bruce Schelkopf

(57) ABSTRACT

A filter has multiple pleated filter elements having axially extending channels having a transverse pleat channel height and a lateral channel width. The pleated filter elements have different channel heights.

6 Claims, 28 Drawing Sheets

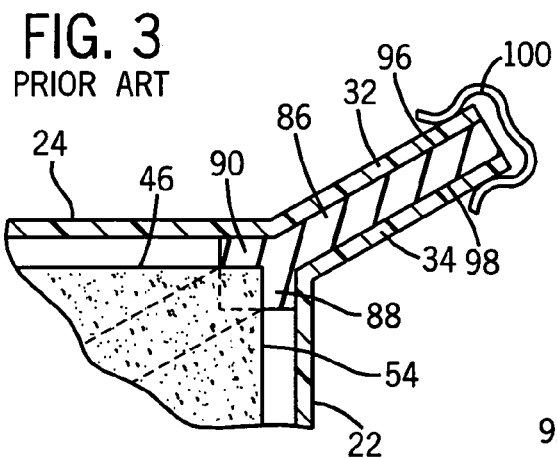
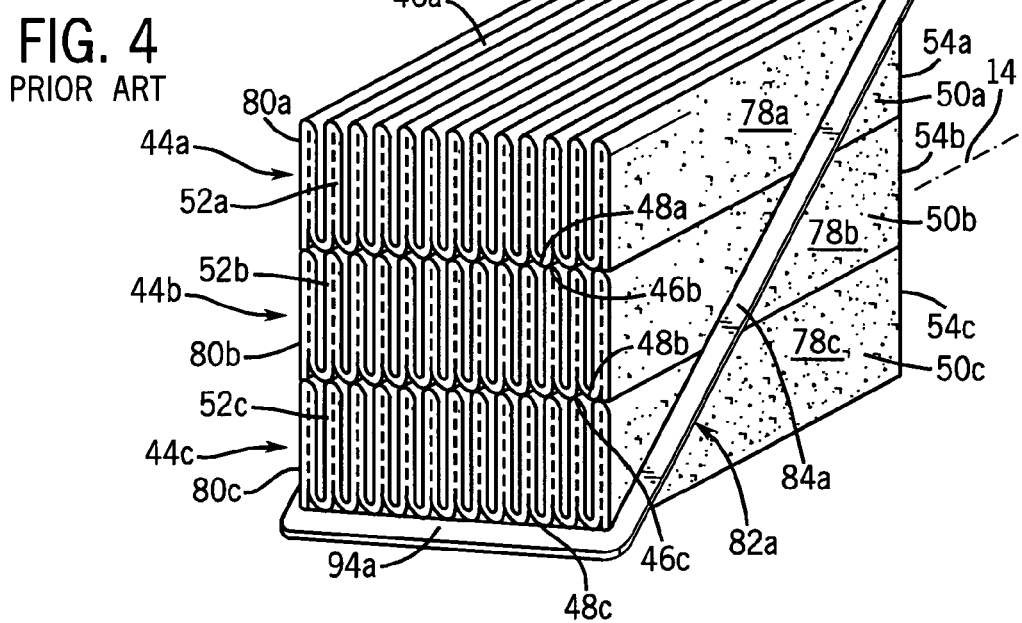
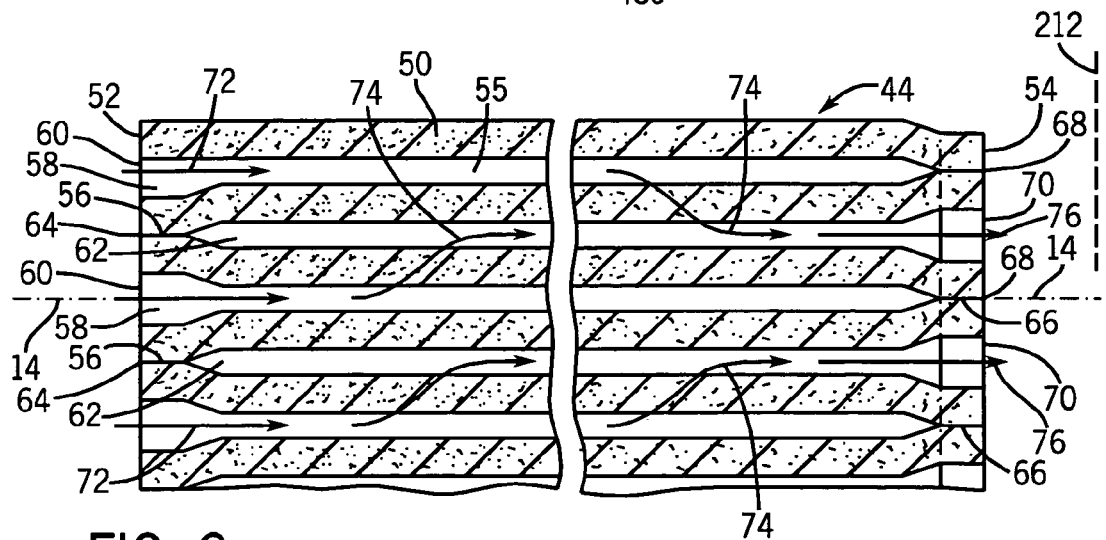

US 7,323,106 B2

MULTI-ELEMENT FILTER WITH MULTIPLE PLEAT CHANNEL HEIGHT

CROSS-REFERENCE TO RELATED APPLICATION

This application is a continuation-in-part of U.S. patent application No. Ser. 11/217,934, filed Sep. 1, 2005.

BACKGROUND AND SUMMARY

The invention relates to fluid filters, and more particularly to multi-element filters.

The invention arose during continuing development efforts directed toward improved filter performance, including lower restriction while still achieving a high media utilization coefficient.

BRIEF DESCRIPTION OF THE DRAWINGS

FIGS. 1-39 are taken from the above noted parent application, including FIGS. 1-23 which are taken from U.S. Pat. No. 6,482,247, incorporated herein by reference.

FIG. 1 is an exploded perspective view of a filter.
FIG. 2 is a sectional view taken along line 2-2 of FIG. 1.
FIG. 3 is a sectional view of a portion of the filter of FIG. 1 in assembled condition.
FIG. 4 is a perspective view similar to a portion of FIG. 1 and shows an alternate embodiment.
FIG. 5 is an exploded perspective view of an alternate embodiment.
FIG. 6 is like FIG. 4 and shows another embodiment.
FIG. 7 is similar to FIG. 6 and illustrates sealing between elements.
FIG. 8 is a sectional view taken along line 8-8 of FIG. 7.
FIG. 9 is like FIG. 7 and shows another embodiment.
FIG. 10 is a sectional view taken along line 10-10 of FIG. 9.
FIG. 11 is a sectional view taken along line 11-11 of FIG. 9.
FIG. 12 is a sectional view taken along line 12-12 of FIG. 9.
FIG. 13 is similar to FIGS. 4, 6, 7, 9, and further illustrates sealing.
FIG. 14 is an elevational view of the front or upstream side of the filter of FIG. 13.
FIG. 15 is an elevational view of the back or downstream side of the filter of FIG. 13.
FIG. 16 is a perspective view showing the inlet end of a filter.
FIG. 17 is a perspective view showing the outlet end of the filter of FIG. 16.
FIG. 18 is a sectional view taken along line 18-18 of FIG. 17.
FIG. 19 is a sectional view taken along line 19-19 of FIG. 18.
FIG. 20 is a sectional view taken along line 20-20 of FIG. 18.
FIG. 21 is a perspective view showing the inlet end of an alternate embodiment of a filter.
FIG. 22 is a perspective view showing the outlet end of the filter of FIG. 21.
FIG. 23 is a sectional view taken along line 23-23 of FIG. 22.
FIG. 24 is a perspective view of a filter in accordance with the parent application.
FIG. 25 is a top elevation view of the filter of FIG. 24.
FIG. 26 is a perspective view like that in FIG. 24.
FIG. 27 is a top elevation view of a further embodiment.
FIG. 28 is like FIG. 24 and shows another embodiment.
FIG. 29 is a top elevation view of the filter of FIG. 28.
FIG. 30 is a perspective view of a filter element showing a filter embodiment.
FIG. 31 is like FIG. 30 and shows a further embodiment.
FIG. 32 is a perspective view like FIG. 24 and shows another embodiment.
FIG. 33 is a front elevation view showing the filter of FIG. 32.
FIG. 34 is a perspective view like FIG. 24 and shows a further embodiment.
FIG. 35 is like FIG. 34 and further shows the filter element.
FIG. 36 is like FIG. 34 and shows a further embodiment.
FIG. 37 is like FIG. 36 and shows a further embodiment.
FIG. 38 is like FIG. 36 and shows a further embodiment.
FIG. 39 is a top elevation view of the filter of FIG. 37.
FIG. 40 is a perspective view showing the inlet end of a filter.
FIG. 41 is a perspective view showing the outlet end of the filter of FIG. 40.
FIG. 42 is a sectional view taken along line 42-42 of FIG. 40.
FIG. 43 is a sectional view taken along line 43-43 of FIG. 40.
FIG. 44 is a view like FIG. 43 and also shows the filter housing.
FIG. 45 is like FIG. 44 and shows opposite direction flow.
FIG. 46 is a perspective view showing the inlet end of another embodiment of a filter.
FIG. 47 is a perspective view showing the outlet end of the filter of FIG. 46.

Present Application

Figure 48:
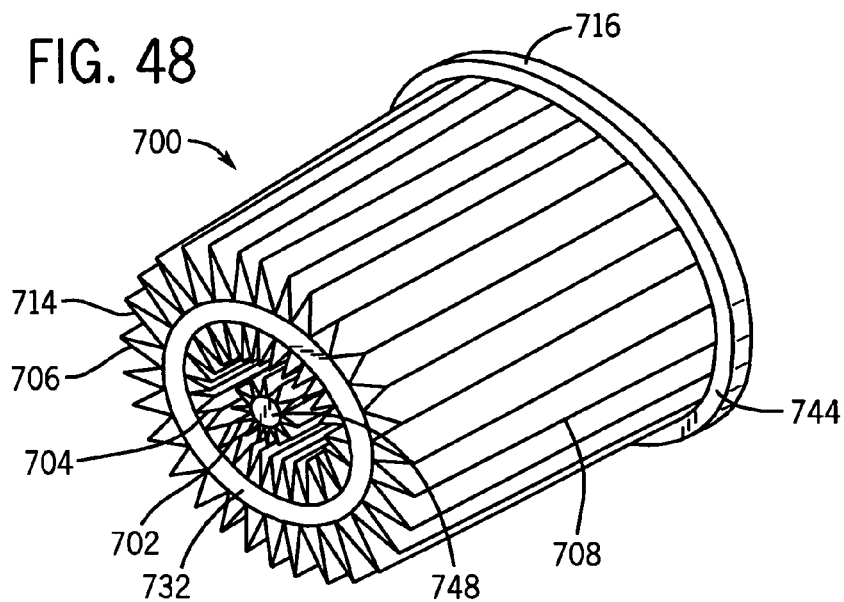
Figure 49:
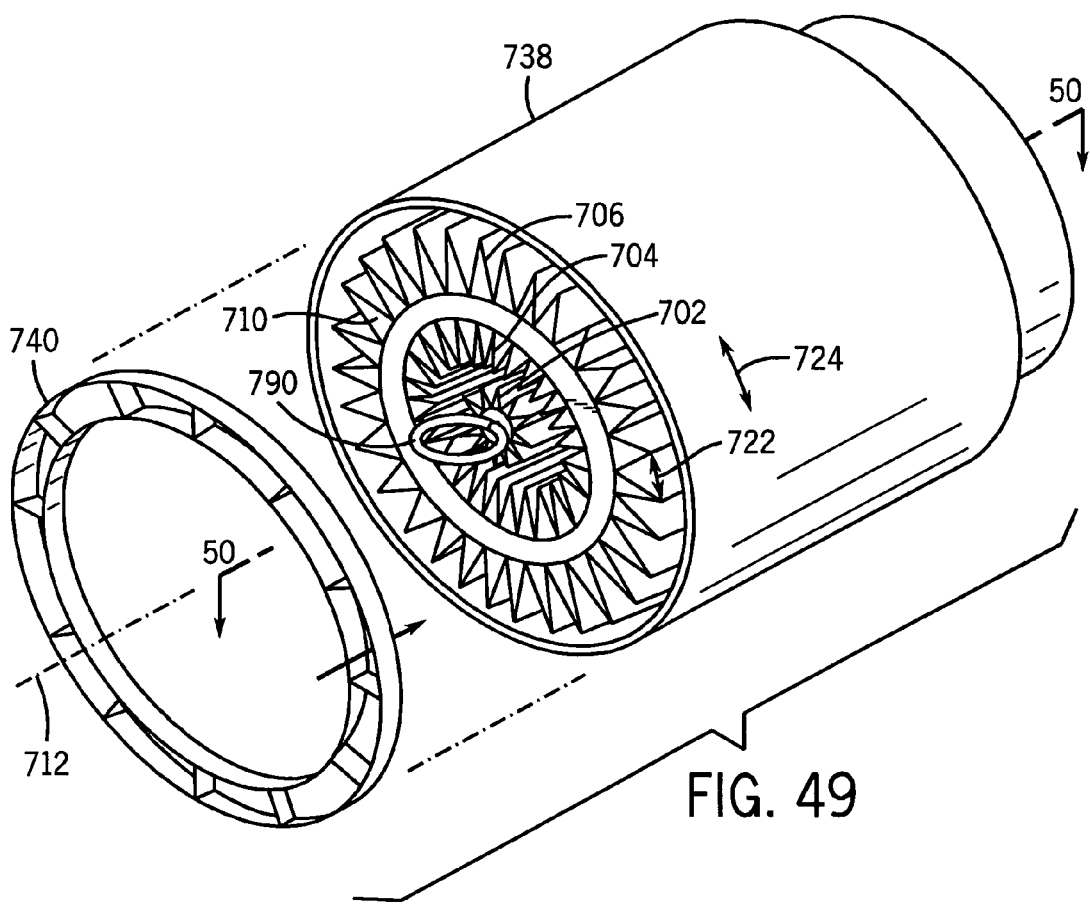
Figure 50:
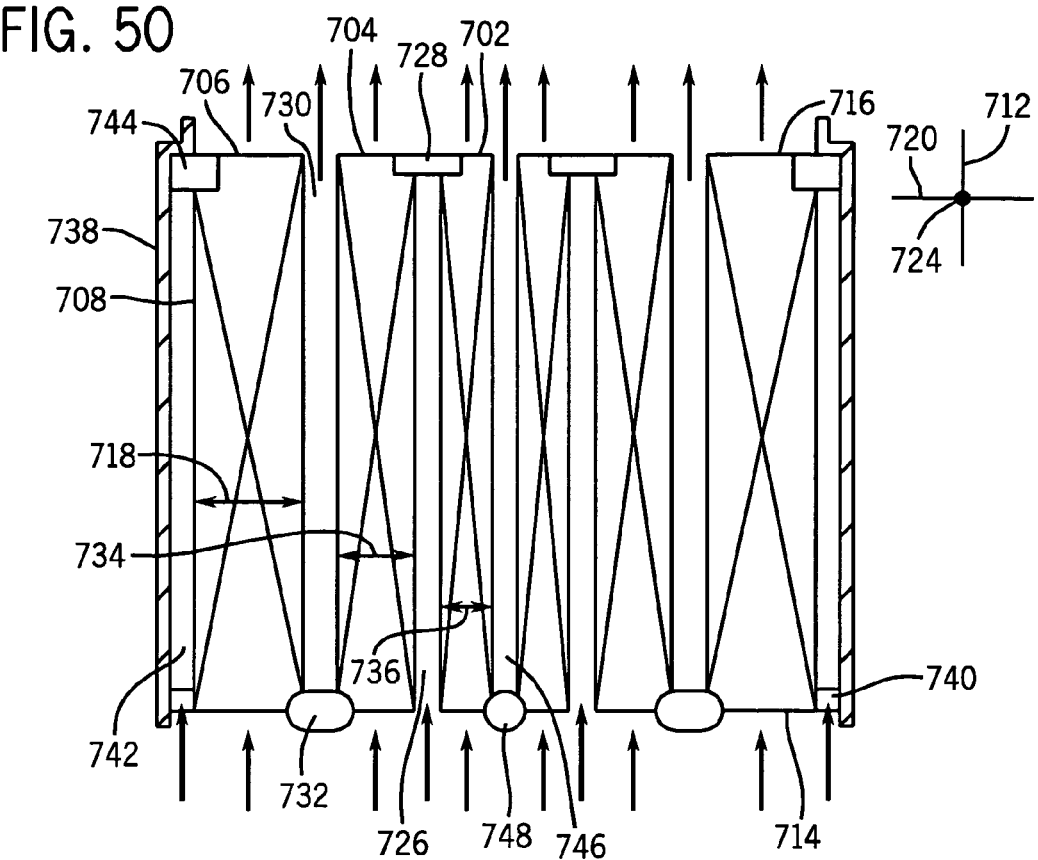
Figure 51:
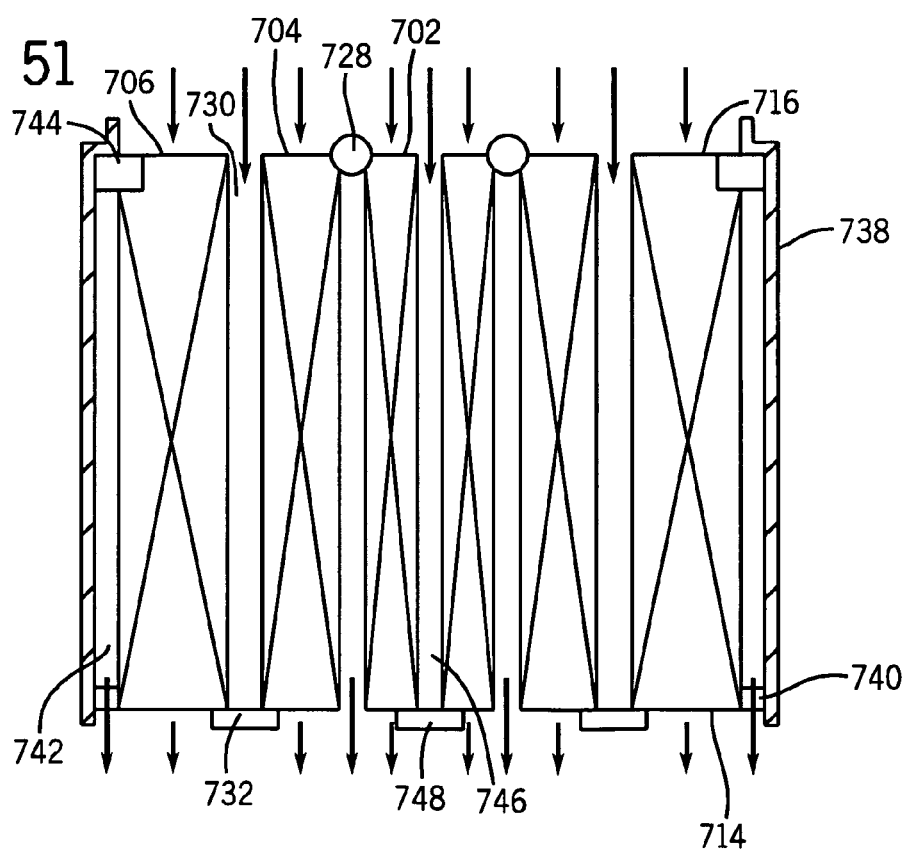
Figure 52:
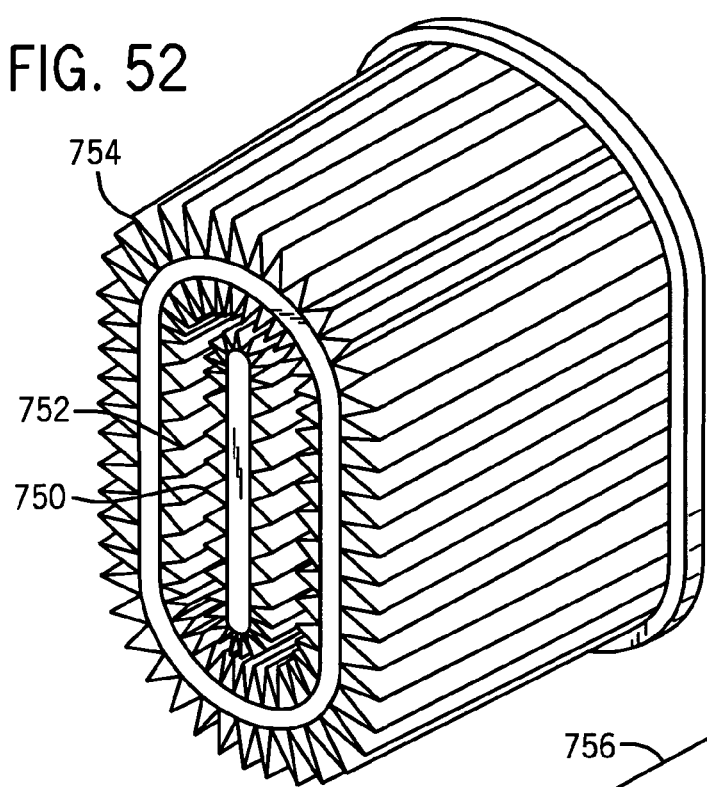
Figure 53:
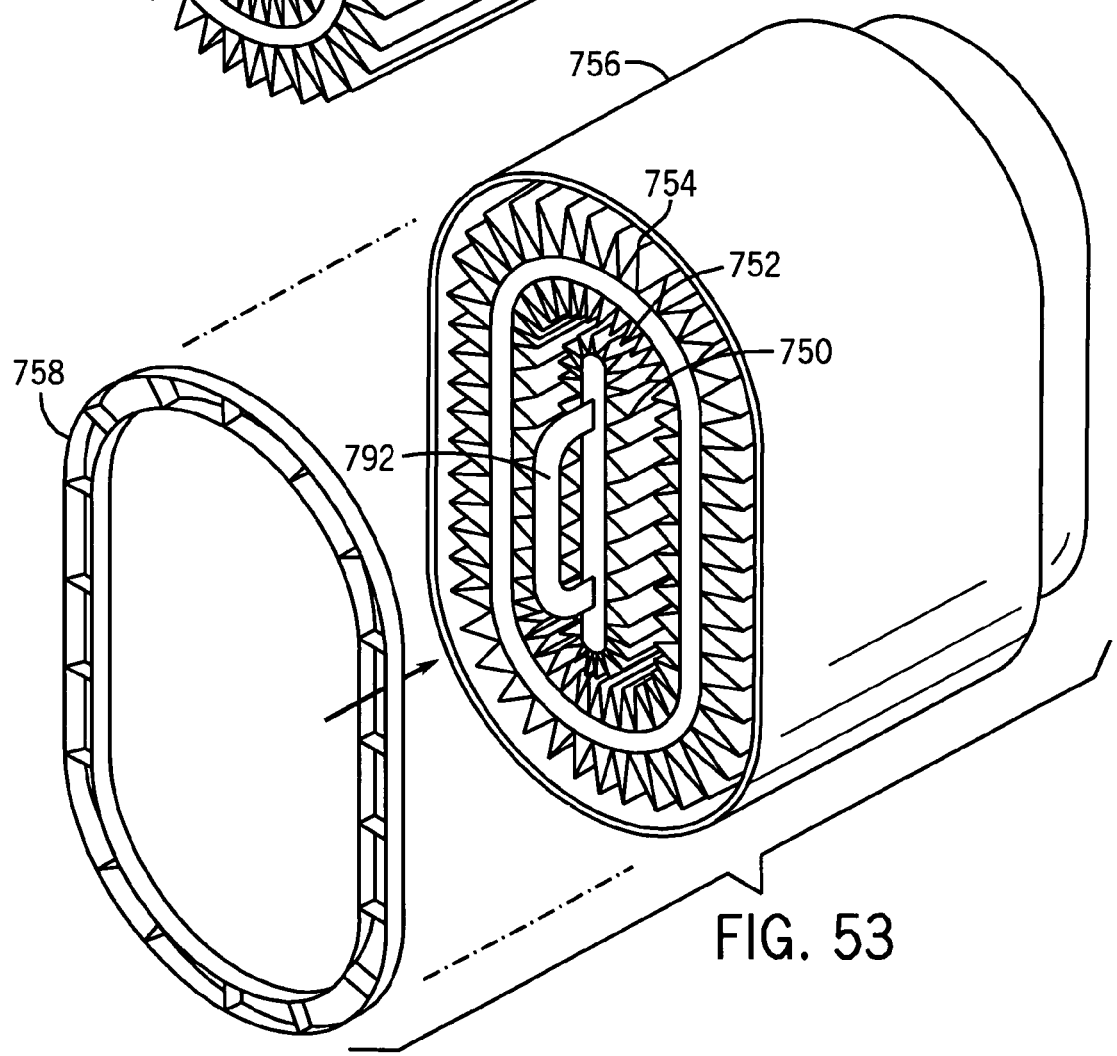
Figure 54:
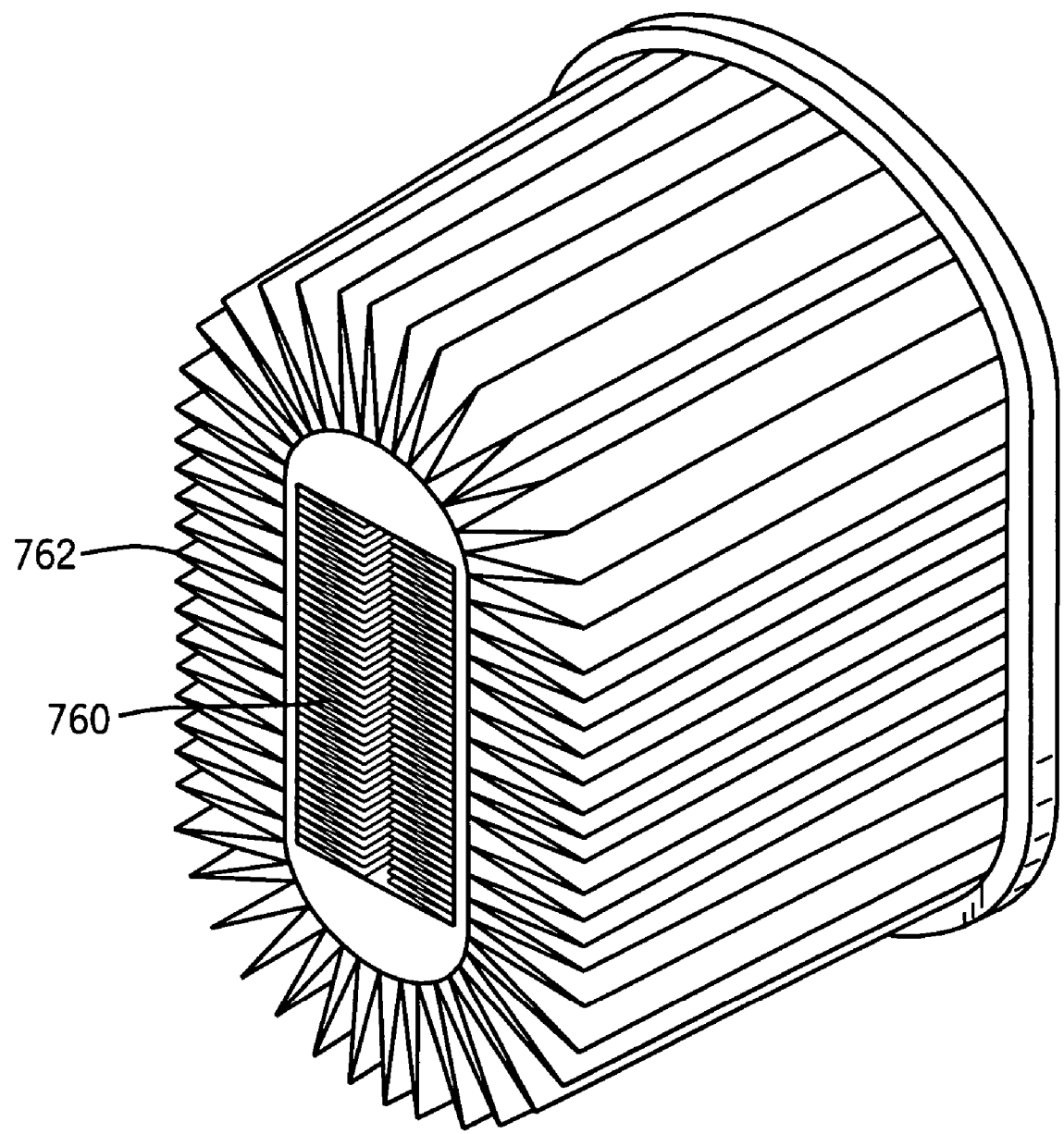
Figure 55:
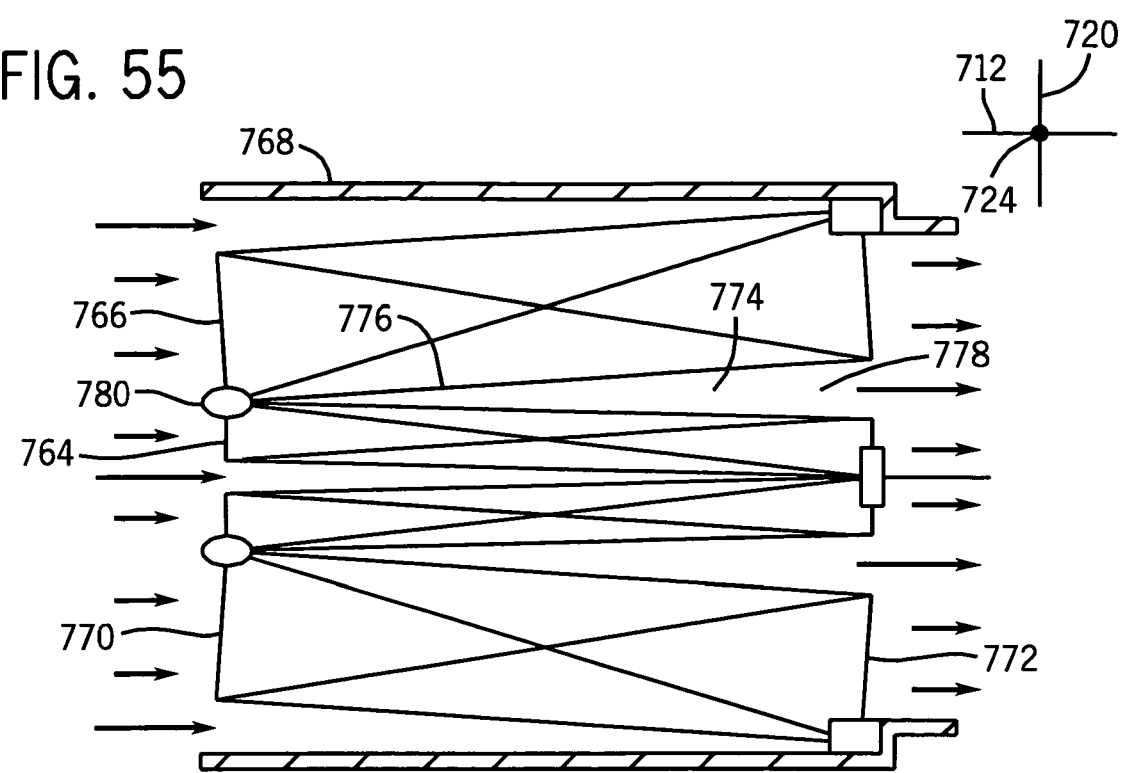
Figure 56:
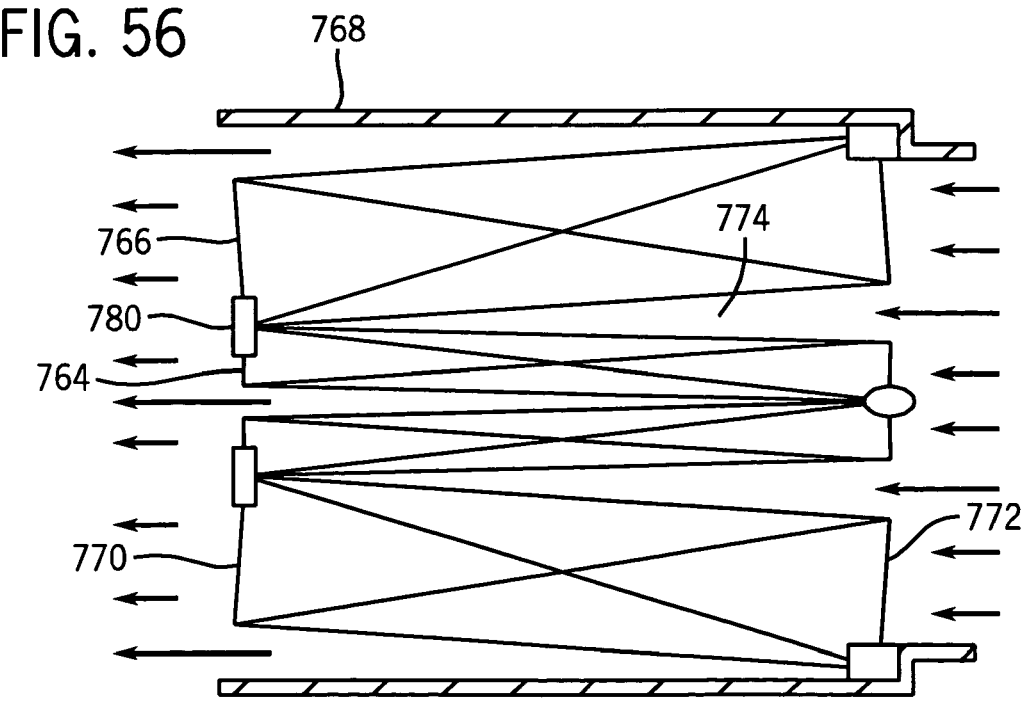

FIG. 48 is a perspective view of a filter in accordance with the present invention.
FIG. 49 is an exploded perspective view of the filter of FIG. 48 housed in a housing.
FIG. 50 is a sectional view taken along line 50-50 of FIG. 49.
FIG. 51 is like FIG. 50 and shows reverse flow.
FIG. 52 is like FIG. 48 and shows another embodiment.
FIG. 53 is like FIG. 49 and shows the embodiment of FIG. 52.
FIG. 54 is like FIG. 52 and shows another embodiment.
FIG. 55 is like FIG. 50 and shows another embodiment.
FIG. 56 is like FIG. 55 and shows reverse flow.

DETAILED DESCRIPTION

Parent Application

The following description of FIGS. 1-39 is taken from the noted parent application, including the description of FIGS. 1-23 taken from U.S. Pat. No. 6,482,247.

Figure 1:
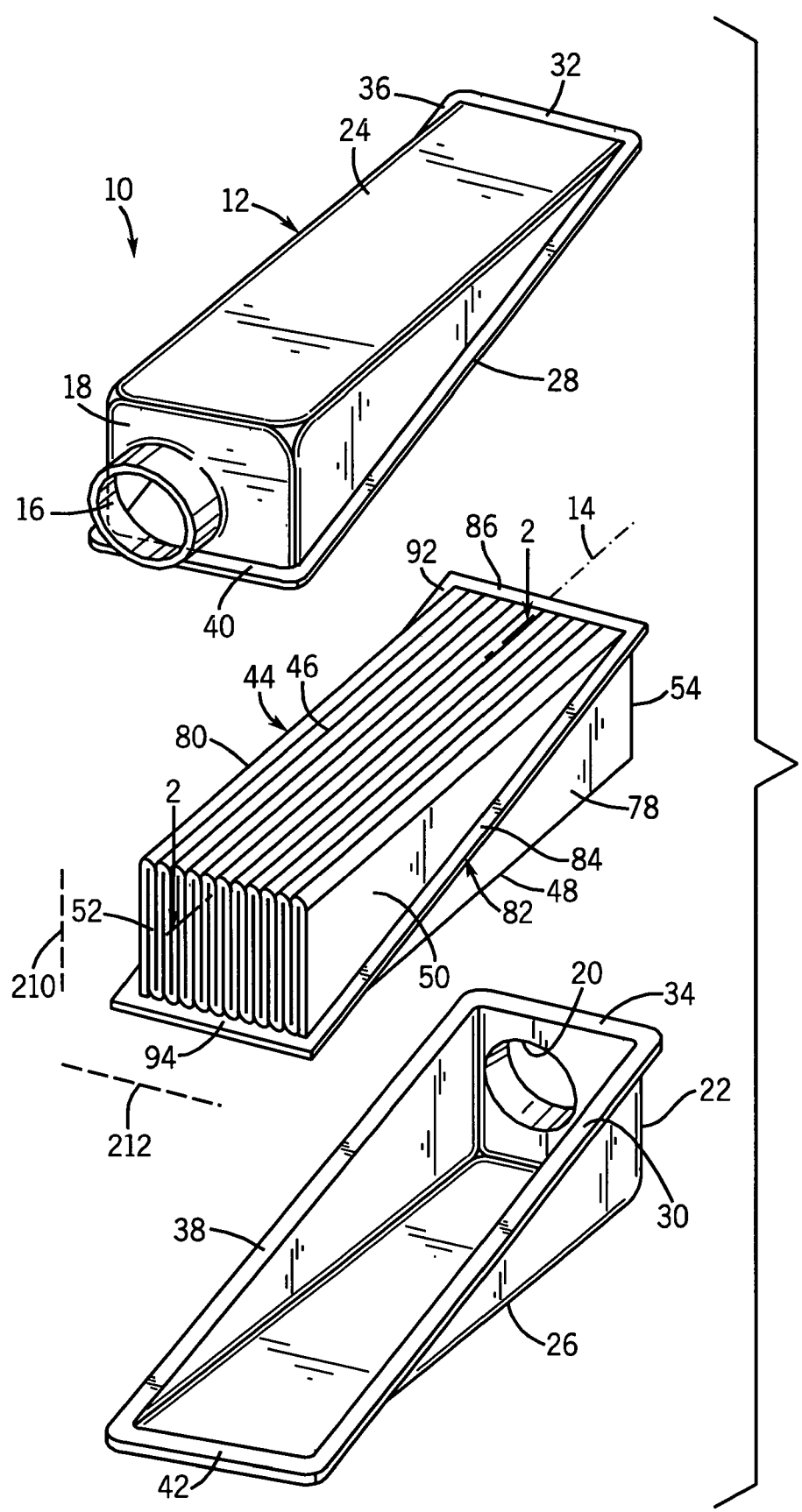

FIG. 1 shows a filter 10 including a housing 12 extending axially along axis 14 and having a inlet 16 at one axial end 18 of the housing and having an outlet 20 at a distally opposite axial end 22 of the housing. The housing is preferably plastic and provided by identical upper and lower half sections 24 and 26 mating along diagonal flanges 28, 30, lateral flanges 32, 34, diagonal flanges 36, 38, and lateral flanges 40, 42.

A pleated filter block is provided by pleated filter element 44 in the housing. The pleated filter element is pleated along a plurality of upper bend lines 46 and lower bend lines 48, which bend lines extend axially. The filter element has a plurality of wall segments 50 extending in serpentine manner between the upper and lower bend lines. The wall segments extend axially between upstream ends 52 at inlet 16, and downstream ends 54 at outlet 20. The wall segments define axial flow channels 55 therebetween, FIG. 2. The upstream ends of the wall segments are alternately sealed to each other, as shown at 56 in FIG. 2, to define a first set of flow channels 58 having open upstream ends 60, and a second set of flow channels 62 interdigitated with the first set of flow channels 58 and having closed upstream ends 64. The downstream ends 54 of wall segments 50 are alternately sealed to each other, as shown at 66 in FIG. 2, such that the first set of flow channels 58 have closed downstream ends 68, and the second set of flow channels 62 have open downstream ends 70. Fluid to be filtered, such as air, flows substantially directly axially through filter element 44, namely from inlet 16 through open upstream ends 60 of the first set of flow channels 58 as shown at arrows 72, then through wall segments 50 as shown at arrows 74, then through open downstream ends 70 of the second set of flow channels 62 as shown at arrows 76, then to outlet 20. It is preferred that at least a portion of each of inlet 16 and outlet 20 are axially aligned.

Filter element 44 has laterally distally opposite right and left axially extending sides 78 and 80, FIG. 1, defining first and second axially extending planes. The second axial plane at side 80 is parallel to and spaced from the first axial plane at side 78. Upper bend lines 46 provide a first or upper set of coplanar bend lines defining a third axially extending plane. Lower bend lines 48 define a lower or second set of coplanar bend lines defining a fourth axially extending plane. The fourth axial plane at lower bend lines 48 is parallel to and spaced from the third axial plane at upper bend lines 46. The third and fourth axial planes are perpendicular to the noted first and second axial planes. Upstream ends 52 of wall segments 50 define a first laterally extending plane, and downstream ends 54 of the wall segments define a second laterally extending plane. The second lateral plane at downstream ends 54 is parallel to and spaced from the first lateral plane at upstream ends 52. The noted first and second lateral planes are perpendicular to the noted first and second axial planes and perpendicular to the noted third and fourth axial planes.

A gasket 82, FIGS. 1, 3, is provided for sealing filter 44 to housing 12, such that air entering inlet 16 cannot bypass the filter element to outlet 20, and instead must flow through the filter element as shown at arrows 72, 74, 76, FIG. 2. Gasket 82 has a first section 84 extending along the noted first axial plane along right side 78. Gasket 82 has a second section 86 extending along the noted second lateral plane at downstream ends 54 as shown at 88 in FIG. 3, and also extending along the noted third axial plane at upper bend lines 46, as shown at 90 in FIG. 3. In alternate embodiments, second section 86 of gasket 82 extends along only one or the other of the noted second lateral plane at 88 or third axial plane at 90, but not both. Gasket 82 has a third section 92 extending along the noted second axial plane along left side 80. Gasket 82 has a fourth section 94 extending along the noted first lateral plane at upstream ends 52 of wall segments 50, and also extending along the noted fourth axial plane at lower bend lines 48, comparably to FIG. 3. In alternate embodiments, fourth section 94 of gasket 82 extends along only one or the other of the noted first lateral plane and fourth axial plane, but not both. Gasket 82 is preferably adhesively secured to filter element 44 along each of the noted gasket sections 84, 86, 92, 94, such that filter element 44 and gasket 82 are replaced as a modular unit. It is further preferred that the upper and lower surfaces of the gasket, such as 96 and 98, FIG. 3, be pinched and compressed between respective housing flanges such as 32 and 34, with such outer peripheral sandwich arrangement being held in assembled condition by any suitable means, such as clip 100, clamps, bolts, or the like. In alternate embodiments, other surfaces of the gasket may be used as the sealing surface against the housing. First and third gasket sections 84 and 92 extend obliquely relative to axis 14. Second and fourth gasket sections 86 and 94 extend perpendicularly to the noted first and second axial planes. Second and fourth gasket sections 86 and 94 are axially spaced, and first and third gasket sections 84 and 92 extend diagonally between second and fourth gasket sections 86 and 94.

FIG. 4 shows a further embodiment having a plurality of filter elements 44a, 44b, 44c stacked on each other. The filter elements have respective wall segments 50a, 50b, 50c with upstream ends 52a, 52b, 52c and downstream ends 54a, 54b, 54c. Upstream ends 52a, 52b, 52c of the wall segments are coplanar along a first laterally extending plane. Downstream ends 54a, 54b, 54c are coplanar along a second laterally extending plane. The second lateral plane is parallel to and spaced from the first lateral plane. The filter elements have respective laterally distally opposite right and left sides 78a and 80a, 78b and 80b, 78c and 80c. Right sides 78a, 78b, 78c are coplanar along a first axially extending plane. Left sides 80a, 80b, 80c are coplanar along a second axially extending plane. The second axial plane is parallel to and spaced from the first axial plane. The filter elements 44a, 44b, 44c have respective upper sets of coplanar bend lines 46a, 46b, 46c, and lower sets of coplanar bend lines 48a, 48b, 48c. The upper set of coplanar bend lines 46a of top filter 44a defines a third axially extending plane. The lower set of coplanar bend lines 48c of the bottom filter element 44c defines a fourth axially extending plane. The fourth axial plane is parallel to and spaced from the third axial plane. The third and fourth axial planes are perpendicular to the first and second axial planes. The noted first and second lateral planes are perpendicular to the noted first and second axial planes and perpendicular to the noted third and fourth axial planes. Gasket 82a has a first section 84a extending along the noted first axial plane along right sides 78a, 78b, 78c. Gasket 82a has a second section 86a extending along the noted second lateral plane along downstream ends 54a, and also along the noted third axial plane along upper bend lines 46a. In alternate embodiments, gasket section 86a extends along only one or the other of the noted second lateral plane along downstream ends 54a or along the noted third axial plane along upper bend lines 46a, but not both. Gasket 82a has a third section 92a extending along the noted second axial plane along left sides 80a, 80b, 80c. Gasket 82a has a fourth section 94a extending along the noted first lateral plane along upstream ends 52a, 52b, 52c, and also extending along the noted fourth axial plane along lower bend lines 48c. In alternate embodiments, gasket section 94a extends along only one of the noted first lateral plane along upstream ends 52a, 52b, 52c or the noted fourth axial plane along lower bend lines 48c, but not both. The construction in FIG. 4 provides a pleated filter block having one or more rows of wall segments 50a, 50b, 50c folded in serpentine manner between respective bend lines, and providing filtered fluid flow substantially directly axially through the filter block along axis 14. First and third gasket sections 84*a* and 92*a* extend obliquely relative to axis 14. Second and fourth gasket sections 86*a* and 94*a* extend perpendicularly to the noted first and second axial planes. Second and fourth gasket sections 86*a* and 94*a* are axially spaced, and first and third gasket sections 84*a* and 92*a* extend diagonally between second and fourth gasket sections 86*a* and 94*a*.

Figure 5:
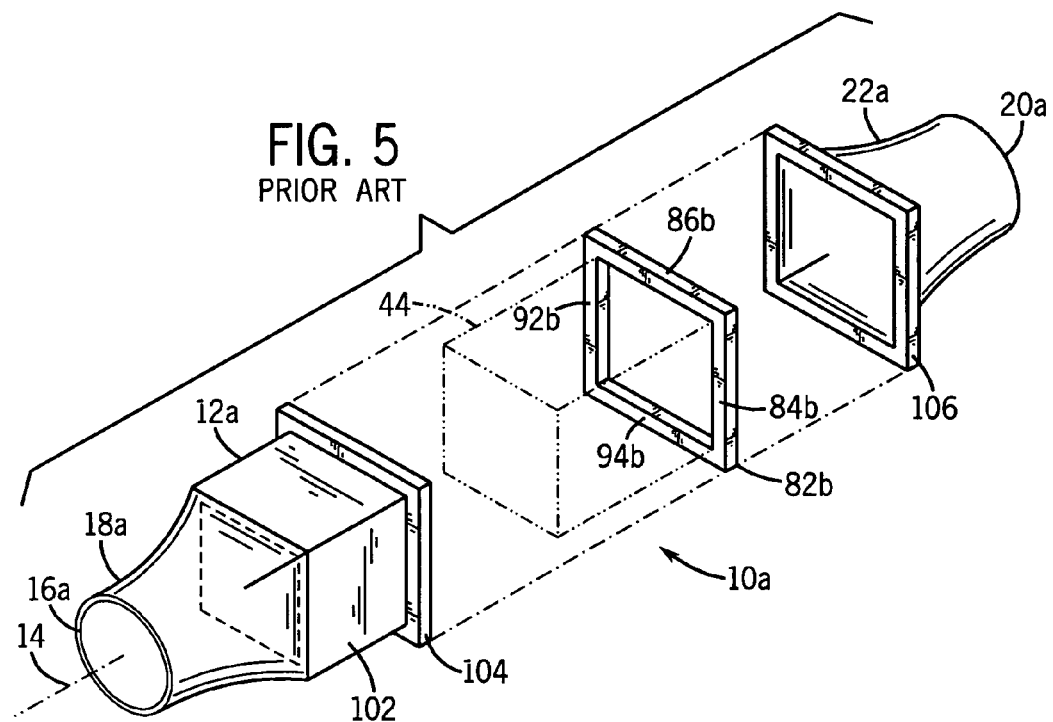

FIG. 5 shows a further embodiment, and uses like reference numerals from above where appropriate to facilitate understanding. Filter 10*a* includes a housing 12*a* extending axially along axis 14 and having an inlet 16*a* at one axial end 18*a* of the housing and having an outlet 20*a* at a distally opposite axial end 22*a* of the housing. The housing is preferably plastic and provided by a box-like member 102 having an outer peripheral flange 104 mating with flange 106 of housing end 22*a* and pinching gasket 82*b* therebetween. Gasket 82*b* seals pleated filter block 44 or 44*a* in the housing. Unlike first and third sections 84 and 92 of gasket 82 in FIG. 1, first and third sections 84*b* and 92*b* of gasket 82*b* in FIG. 5 extend perpendicularly relative to the noted third and fourth axial planes. Like second and fourth sections 86 and 94 of gasket 82 in FIG. 1, second and fourth sections 86*b* and 94*b* of gasket 82*b* in FIG. 5 extend perpendicularly to the noted first and second axial planes. Gasket 82*b* has first section 84*b* extending along the noted first axial plane along right side 78 and also preferably extending along one of the noted lateral planes preferably the noted second lateral plane along downstream ends 54. Gasket 82*b* has second section 86*b* extending along the noted third axial plane along upper bend lines 46 and also along the noted one lateral plane preferably the lateral plane along downstream ends 54. Gasket 82*b* has third section 92*b* extending along the noted second axial plane along left side 80 and preferably along the noted one lateral plane preferably the lateral plane formed at downstream ends 54. Gasket 82*b* has fourth section 94*b* extending along the noted fourth axial plane along the noted lower bend lines 48 and also preferably along the noted one lateral plane preferably the lateral plane along downstream ends 54.

Figure 6:
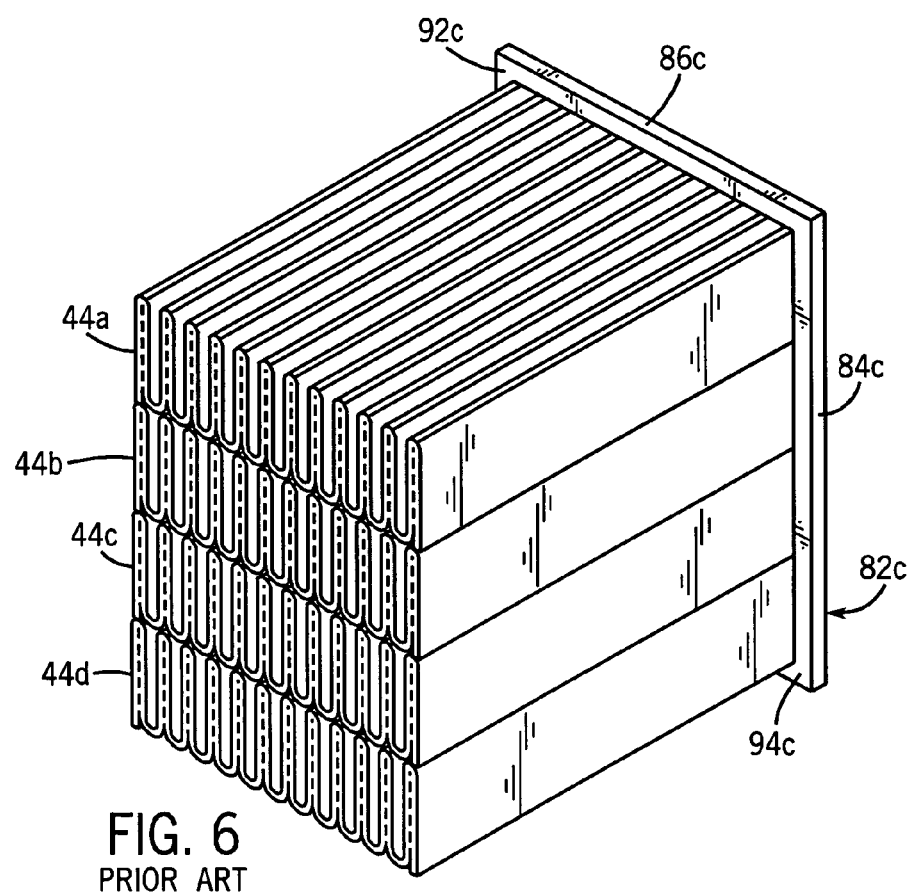

FIG. 6 shows a further embodiment and uses like reference numerals from above where appropriate to facilitate understanding. Filter elements 44*a*, 44*b*, 44*c*, 44*d* are stacked on each other. Gasket 82*c* corresponds to gasket 82*b* of FIG. 5 and includes corresponding gasket sections 84*c*, 86*c*, 92*c*, 94*c*.

Figure 7:
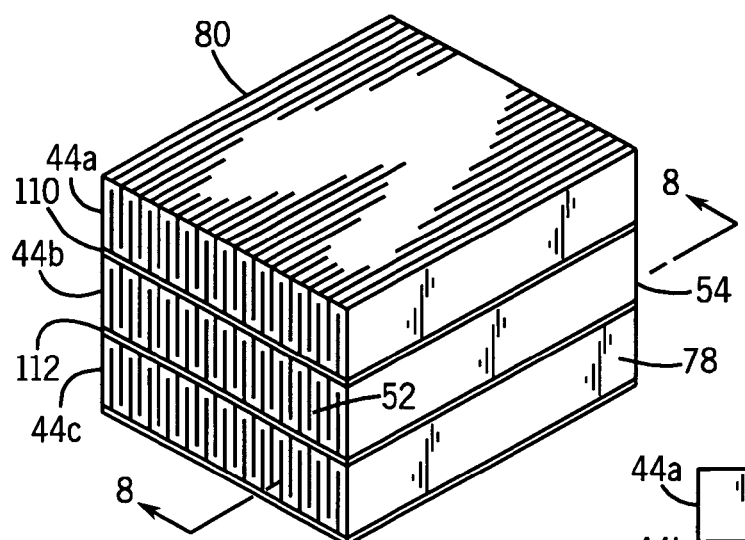
Figure 8:
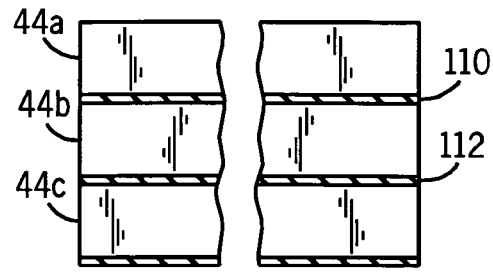
Figure 9:
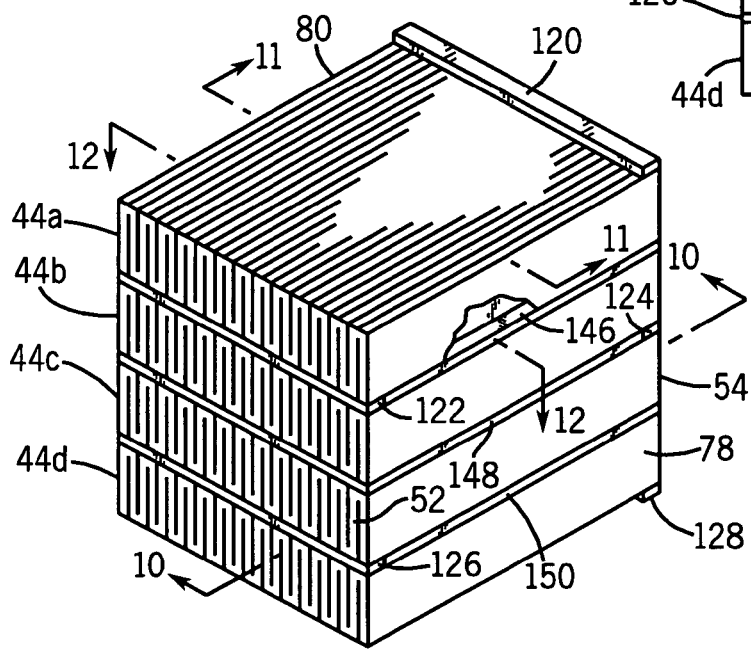
Figure 10:
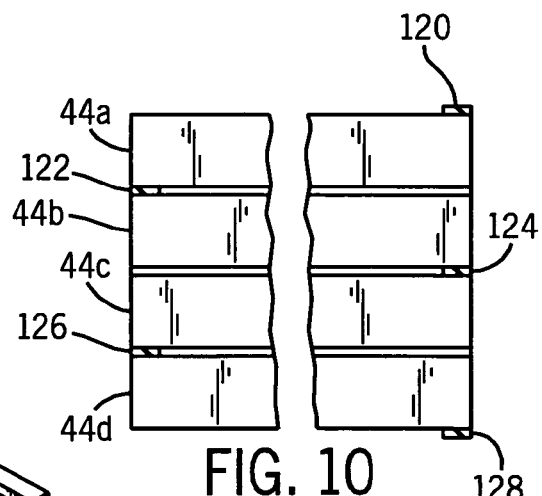
Figure 11:
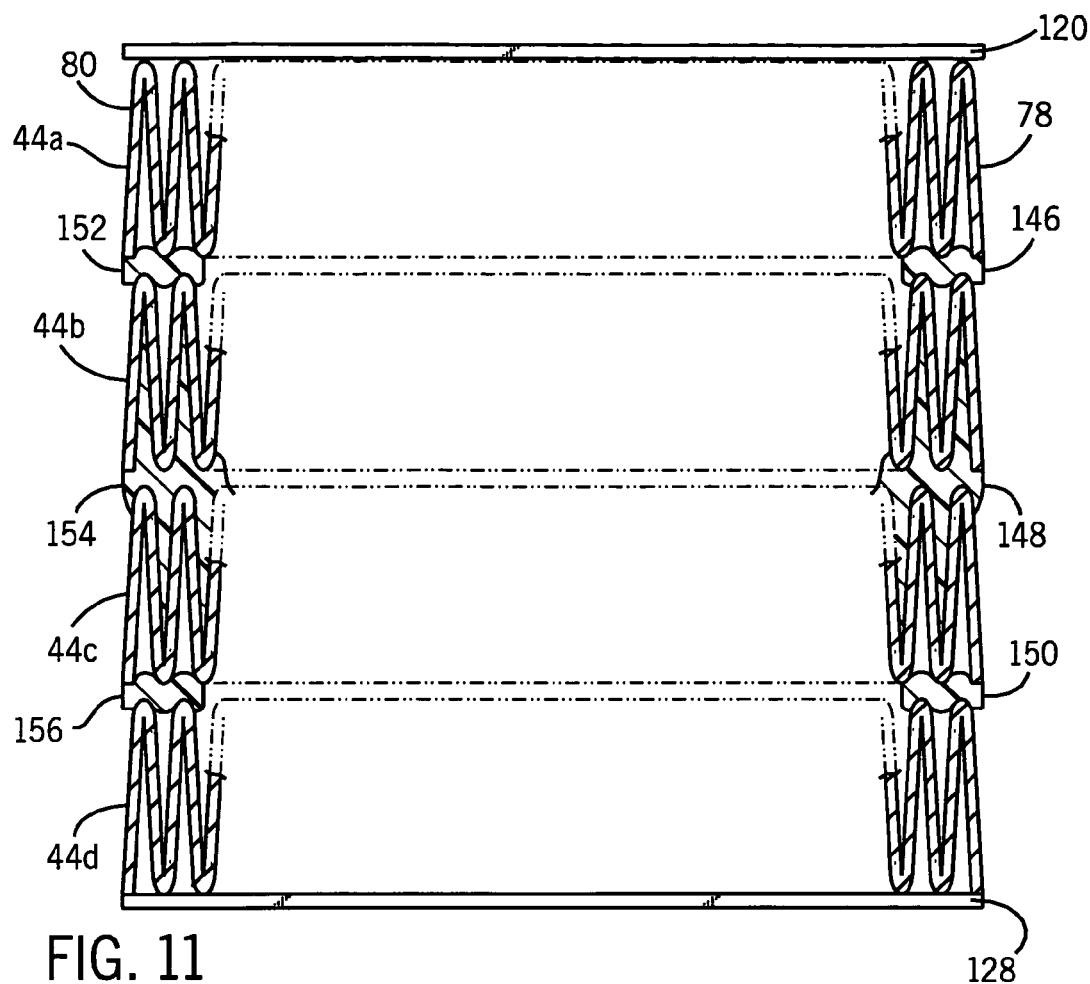
Figure 12:
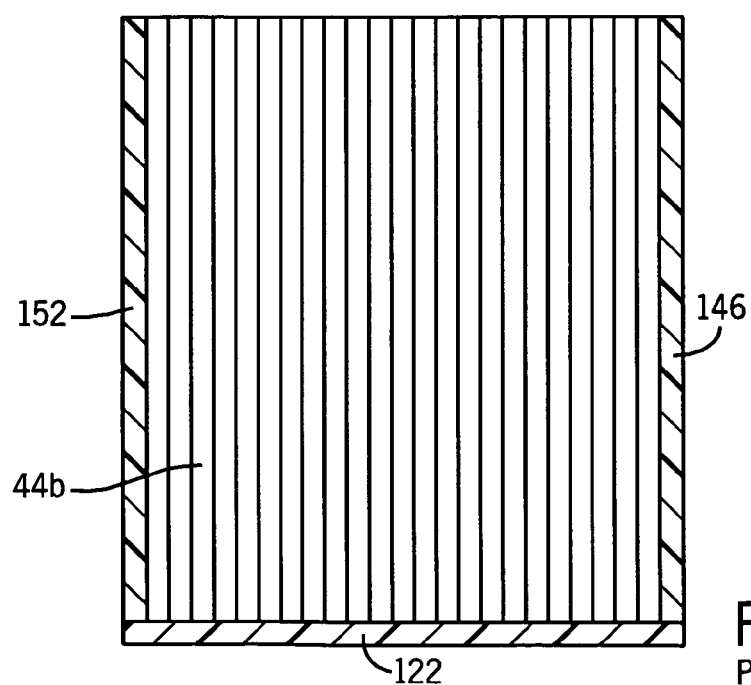

FIG. 7 is similar to FIG. 6 and uses like reference numerals from above where appropriate to facilitate understanding. Layers of sealing material 110, 112, etc. are between respective adjacent stacked filter elements, FIG. 8. In one embodiment, each layer 110, 112, etc. is impervious to the noted fluid to be filtered. In another embodiment, each layer 110, 112, etc. is pervious to such fluid and filters fluid flow therethrough. In the embodiment of FIGS. 7 and 8, each layer 110, 112, etc. spans the entire area between upstream ends 52 and downstream ends 54 and between right and left sides 78 and 80.

FIGS. 9-15 show another embodiment wherein the noted sealing layers of FIGS. 7 and 8 need not span the entire noted area between upstream and downstream ends 52 and 54 and right and left sides 78 and 80. In FIGS. 9-15, the noted sealing layers are provided by alternating strip layers such as 120, 122, 124, 126, 128, FIGS. 9, 10, including a first set of one or more upstream laterally extending strip layers 122, 126, etc., and a second set of one or more downstream laterally extending strip layers 120, 124, 128, etc., interdigitated with the first set of strip layers. Each strip layer 122, 126, etc. of the first set extends laterally between the right and left sides 78 and 80 at upstream end 52 and extends along the lower bend lines of the filter element thereabove and the upper bend lines of the filter element therebelow. Each strip layer 120, 124, 128, etc. of the second set extends laterally between right and left sides 78 and 80 at downstream end 54 and extends along the lower bend lines of the filter element thereabove and the upper bend lines of the filter element therebelow. A given filter element, e.g. 44*b*, has a strip layer 122 of the first set extending laterally along its upper bend lines at upstream end 52, and a strip layer 124 of the second set extending laterally along its lower bend lines at downstream end 54. Filter element 44*b* has no strip layer along its upper bend lines at downstream end 54, and has no strip layer along its lower bend lines at upstream end 52.

A first filter element such as 44*a* has a first strip layer 122 of the first set extending along its lower bend lines at upstream end 52, a second filter element such as 44*b* has a first strip layer 124 of the second set extending laterally along its lower bend lines at downstream end 54, a third filter element such as 44*c* has a second strip layer 126 of the first set extending along its lower bend lines at upstream end 52. The noted first and second filter elements 44*a* and 44*b* have the first strip layer 122 of the first set extending laterally therebetween at upstream end 52. The noted first and second filter elements 44*a* and 44*b* have no strip layer extending laterally therebetween at downstream end 54. The noted second and third filter elements 44*b* and 44*c* have first strip layer 124 of the second set extending laterally therebetween at downstream end 54. The noted second and third filter elements 44*b* and 44*c* have no strip layer extending laterally therebetween at upstream end 52.

Figure 13:
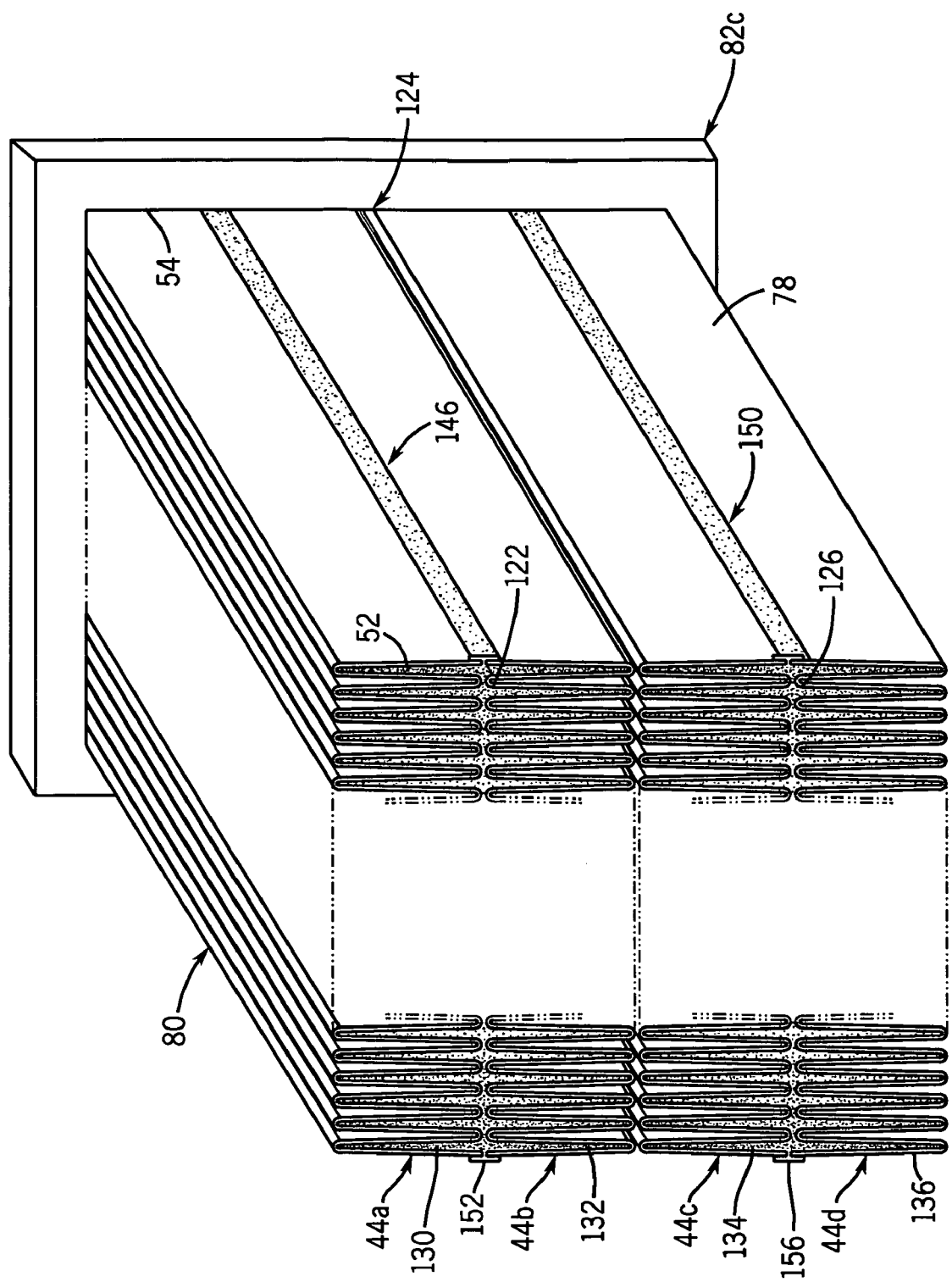
Figure 15:
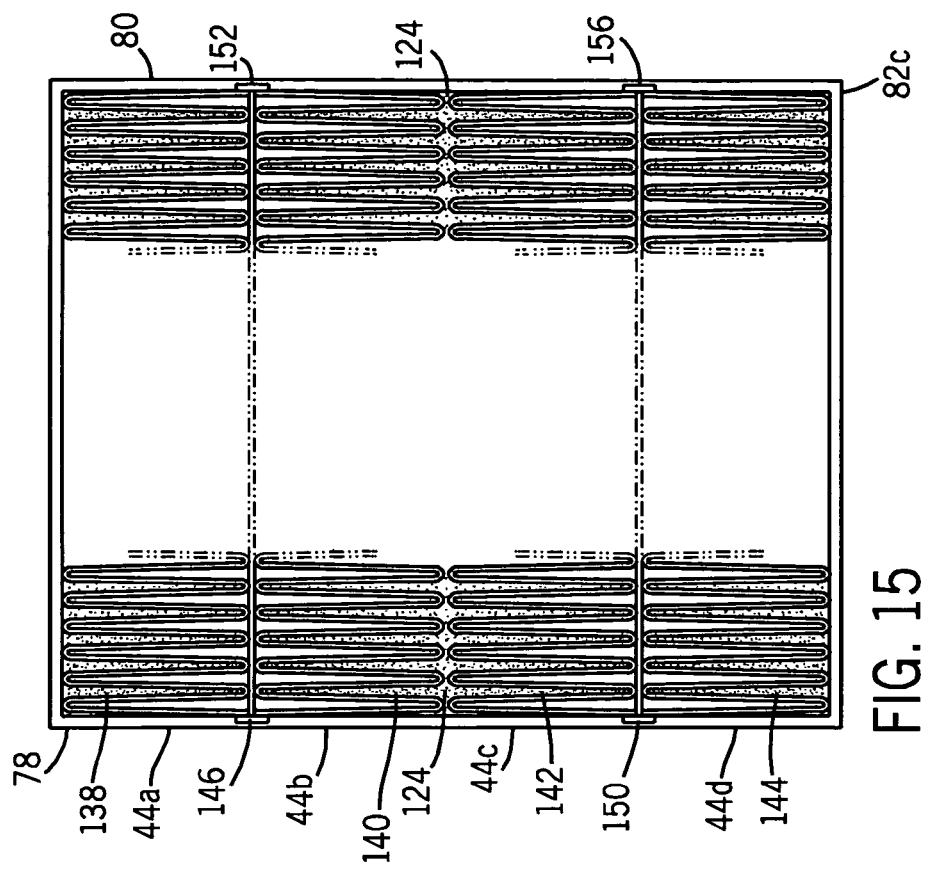
Figure 14:
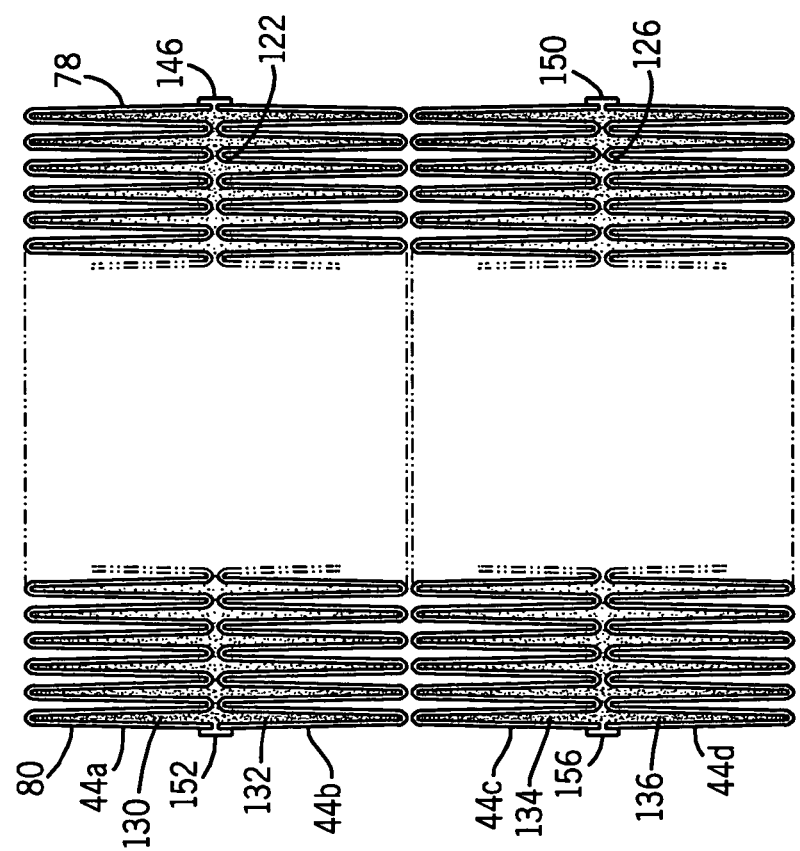

As shown in FIGS. 13 and 14, the closed upstream ends of the noted second set of flow channels are closed by sealing material such as 130 at filter element 44*a*, 132 at filter element 44*b*, 134 at filter element 44*c*, 136 at filter element 44*d*. The closed downstream ends of the first set of flow channels are closed by sealing material such as 138, FIG. 15, at filter element 44*a*, 140 at filter element 44*b*, 142 at filter element 44*c*, 144 at filter element 44*d*. Lateral sealing strip 122, FIGS. 13, 14, is sealed to the sealing material 130 in the closed upstream ends of the flow channels of filter element 44*a* thereabove and is sealed to sealing material 132 in the closed upstream ends of the flow channels of filter element 44*b* therebelow. Lateral strip 122 may be adhesively bonded to sealing material 130, 132, or may be integrally formed therewith as in a hot melt application, or the like. Lateral strip 126 is sealed to sealing material 134 in the closed upstream ends of the flow channels of filter element 44*c* thereabove and is sealed to the closed upstream ends of the flow channels of filter element 44*d* therebelow. Lateral sealing strip 124, FIG. 15, is sealed to sealing material 140 in the closed downstream ends of the flow channels of filter element 44*b* thereabove and is sealed to sealing material 142 in the closed downstream ends of the flow channels of filter element 44*c* therebelow. The described sealing protects the downstream, clean areas of the filter from the upstream, dirty areas of the filter.

In FIGS. 9-15, the noted sealing layers are also provided by a right set of axially extending side edge layers 146, 148, 150, etc., FIGS. 9, 11, 12, 13, 14, and a left set of axially extending side edge layers 152, 154, 156, etc. Each side edge layer of the right set extends axially from upstream end 52 to downstream end 54 and engages the right side of the filter element thereabove and the right side of the filter element therebelow such that the right side of the filter element is sealed to the right side of the filter element thereabove and to the right side of the filter element therebelow. Each side edge layer of the left set extends axially from upstream end 52 to downstream end 54 and engages the left side of the filter element thereabove and the left side of the filter element therebelow such that the left side of the filter element is sealed to the left side of the filter element thereabove and to the left side of the filter element therebelow. Side edge layers 148 and 154 are optional because of the sealing provided by downstream lateral sealing strip layer 124. FIGS. 13 and 14 show deletion of side edge layers 148 and 154. The noted lateral strip layers and side edge layers protect downstream and clean areas of the filter are from the upstream and dirty areas of the filter. The noted strip layers and edge layers are preferably provided by adhesive such as hot melt, though other types of sealing strips may be used.

FIGS. 16-23 use like reference numerals from above where appropriate to facilitate understanding.

Figure 16:
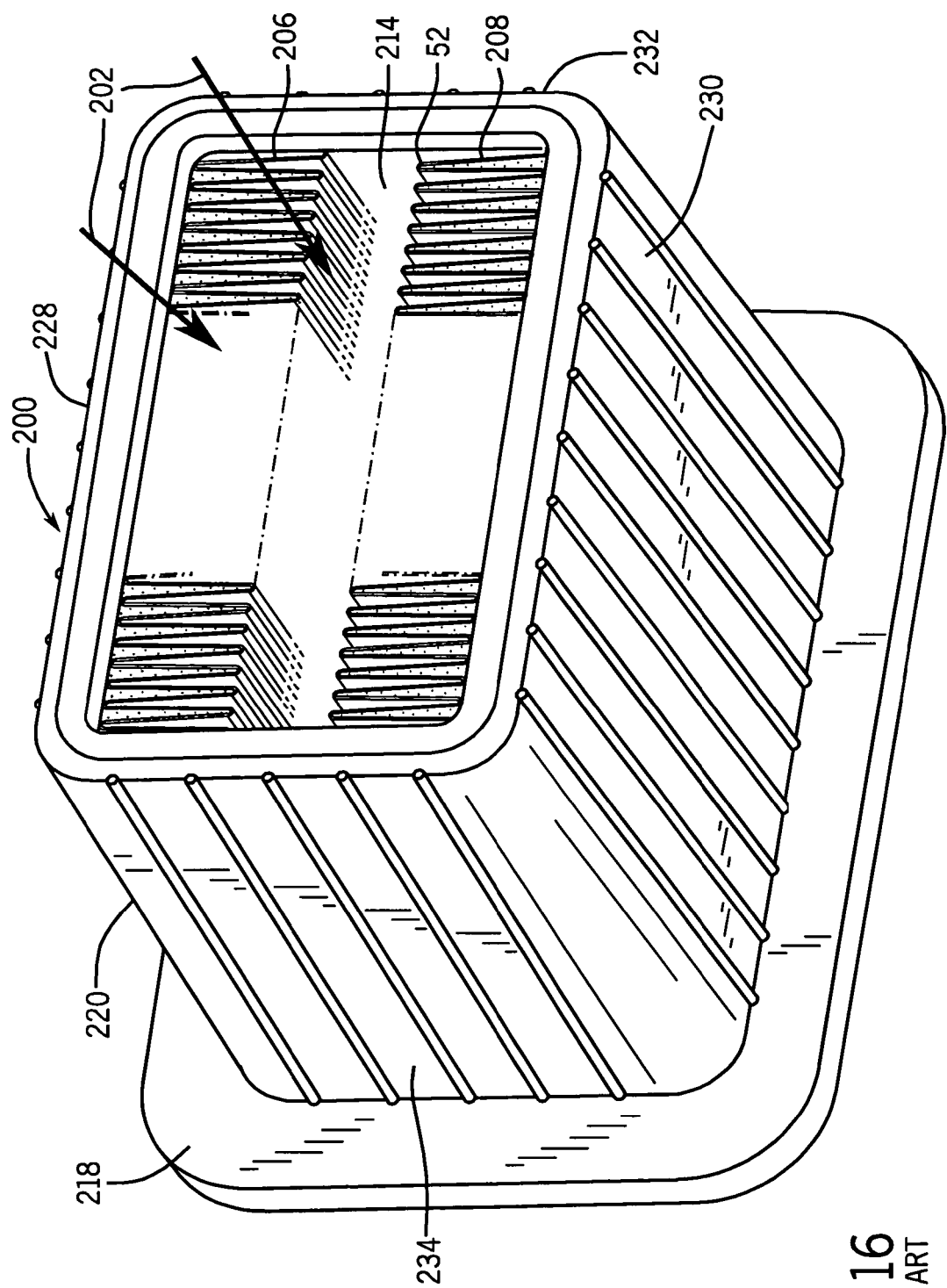
Figure 17:
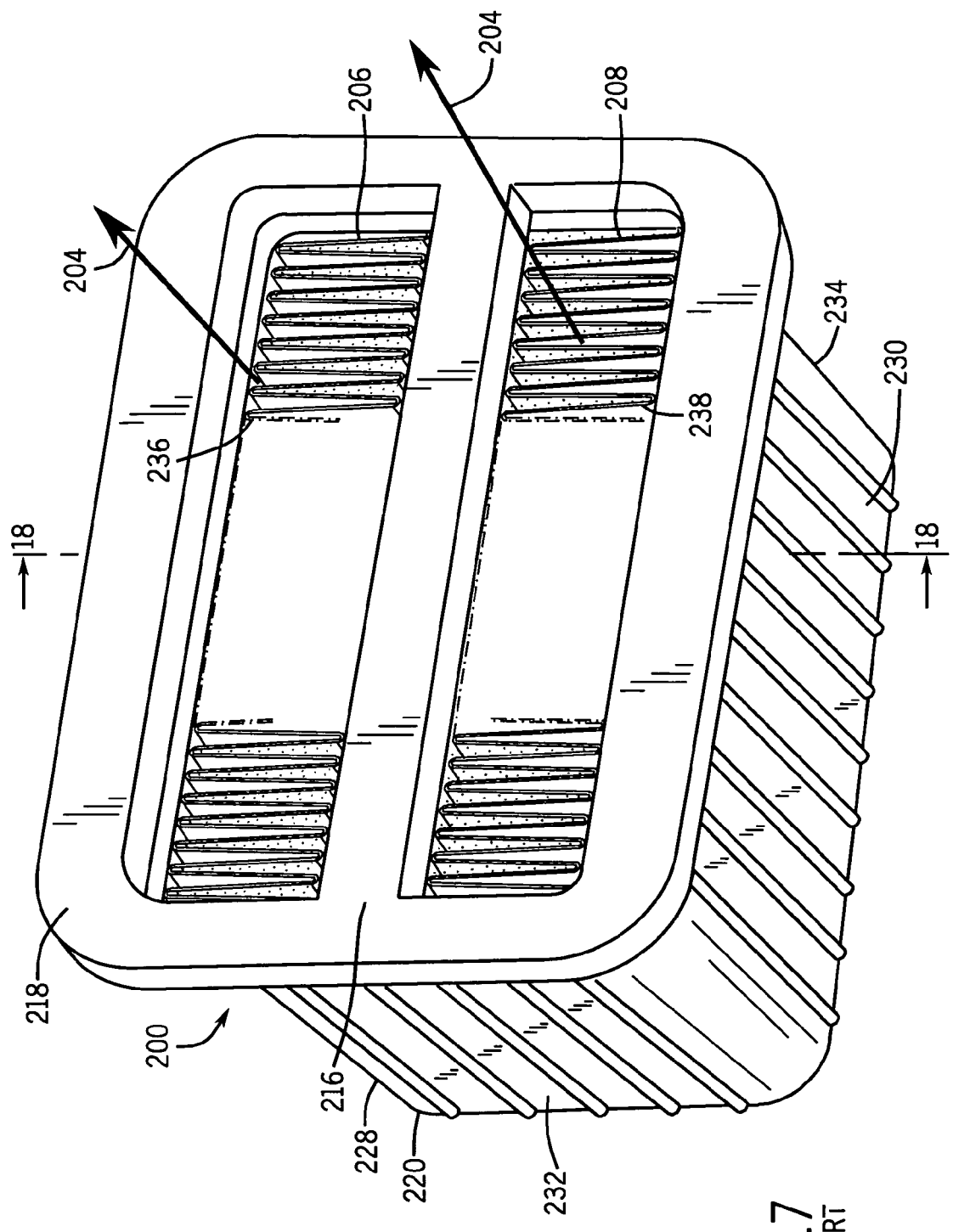

FIGS. 16 and 17 show a filter 200 for filtering fluid flowing along an axial flow direction 14, FIGS. 1, 2, as shown at inlet flow arrows 202, FIG. 16 and outlet flow arrows 204, FIG. 17. The filter has a pair of panels or rows of pleated filter elements 206 and 208. Each filter element has a plurality of pleats defined by wall segments 50, FIGS. 1, 2, extending along a transverse direction 210 between first and second sets of pleat tips at first and second sets of axially extending bend lines 46 and 48. Transverse direction 210 is perpendicular to axial direction 14. Each of the panels 206 and 208 extends along a lateral direction 212 perpendicular to axial direction 14 and perpendicular to transverse direction 210. Wall segments 50 extend axially between upstream and downstream ends 52 and 54. The wall segments define axial flow channels 55 therebetween. The upstream ends of the wall segments are alternately sealed to each other, as shown at 56 in FIG. 2, to define a first set of flow channels 58 having open upstream ends 60, and a second set of flow channels 62 interdigitated with the first set of flow channels 58 and having closed upstream ends 64. The downstream ends 54 of wall segments 50 are alternately sealed to each other, as shown at 66 in FIG. 2, such that the first set of flow channels 58 have closed downstream ends 68, and the second set of flow channels 62 have open downstream ends 70. Fluid to be filtered, such as air, flows substantially directly axially through the filter element 44 of each of the panels 206, 208, through open upstream ends 60 of the first set of flow channels 58 as shown at arrows 72, FIG. 2, then through wall segments 50 as shown at arrows 74, then through open downstream ends 70 of the second set of flow channels 62 as shown at arrows 76.

Panels 206 and 208 have a transverse gap 214, FIG. 16, therebetween at upstream end 52, and are sealed to each other at downstream end 54 by sealing strip 216 which may be part of cover flange 218 at the downstream end of filter housing 220. Gap 214 provides additional fluid flow axially therethrough as shown at arrow 222, FIG. 18, i.e. fluid flows axially through the filter as described above and shown at arrows 72, 74, 76, FIG. 2, and additionally flows through the filter as shown at arrows 222, 224, 226, FIG. 18. Housing 220 includes laterally extending sidewalls 228 and 230 generally parallel to panels 206 and 208 and spaced transversally on distally opposite sides thereof Housing 220 also includes sidewalls 232 and 234 extending transversely between lateral sidewalls 228 and 230. Sidewalls 228 and 230 are preferably slightly tapered outwardly away from each other from upstream end 52 to downstream end 54 and are sealed at their upstream ends to respective panels 206, 208, and have transverse gaps 236, 238 formed between sidewalls 228, 230 and respective panels 206, 208 at the downstream end providing the noted additional fluid flow 226 axially therethrough. In one embodiment, the filter panels are sealed to the housing by adhesive, and in another embodiment, the filter panels are sealed to the housing by a gasket as above described. In a further embodiment, the flow direction may be reversed such that incoming fluid flow enters the filter at end 54 through flow channels 70 and gaps 236, 238, and exits the filter at end 52 through flow channels 58 and gap 214.

Figure 23:
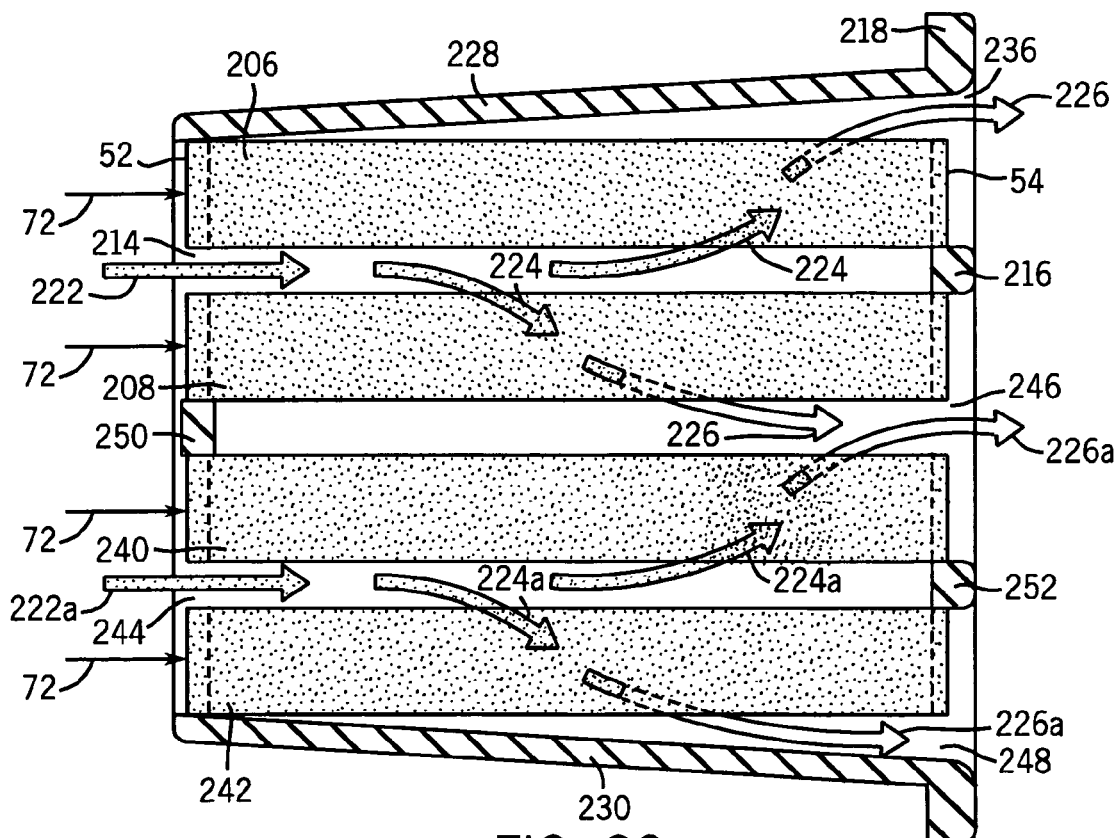
Figure 19:
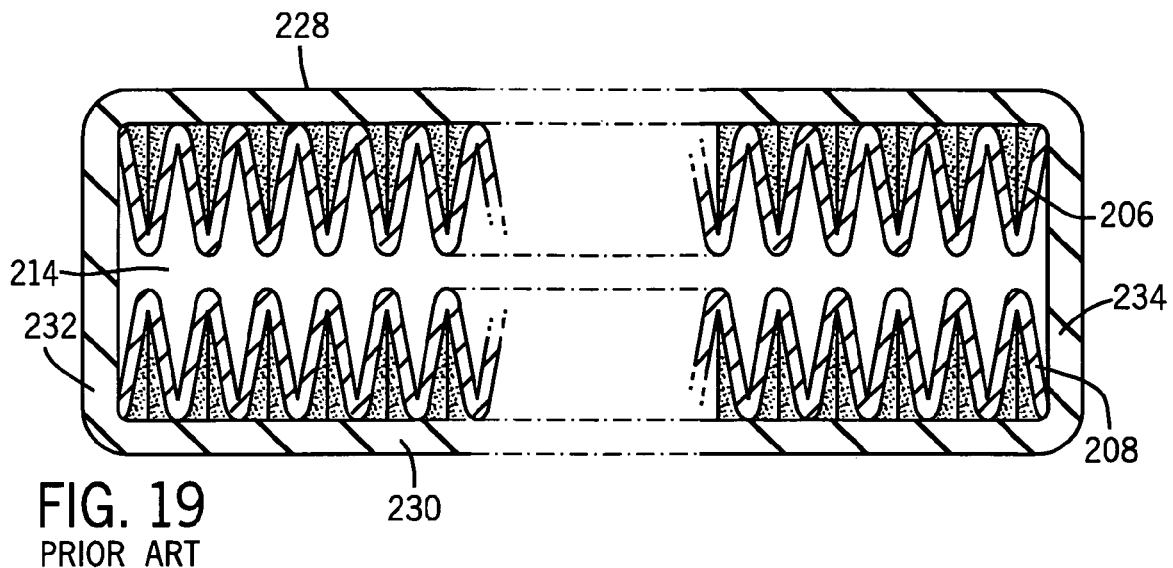
Figure 20:
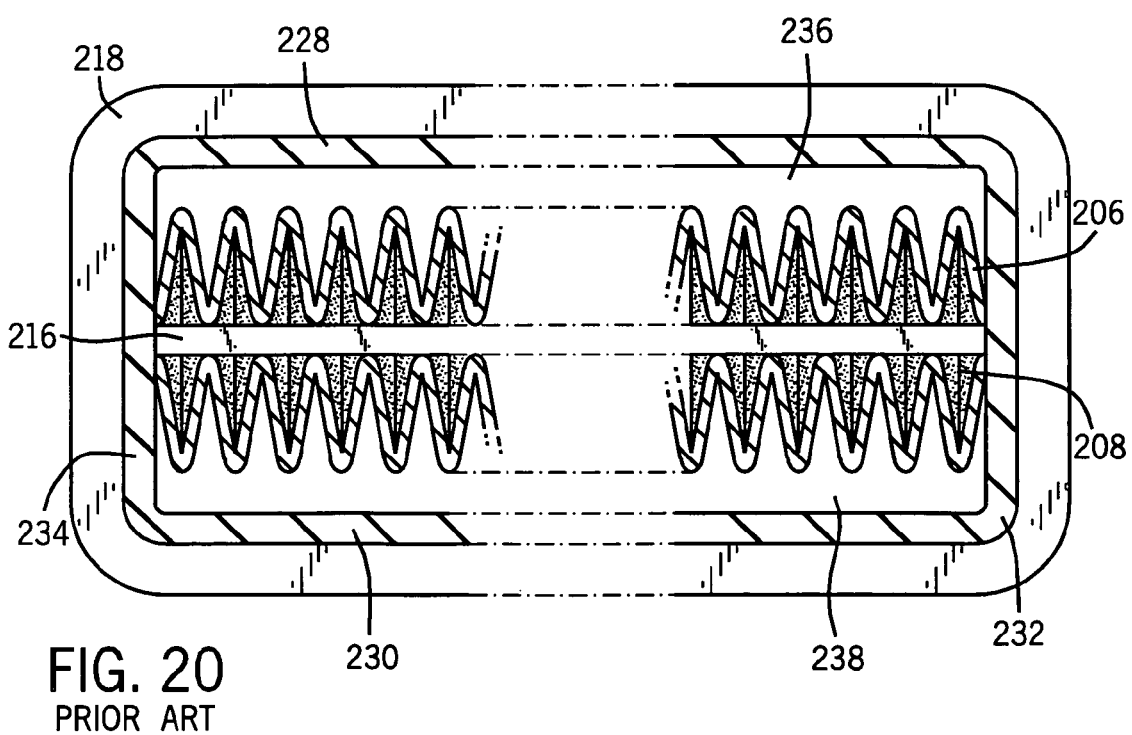
Figure 21:
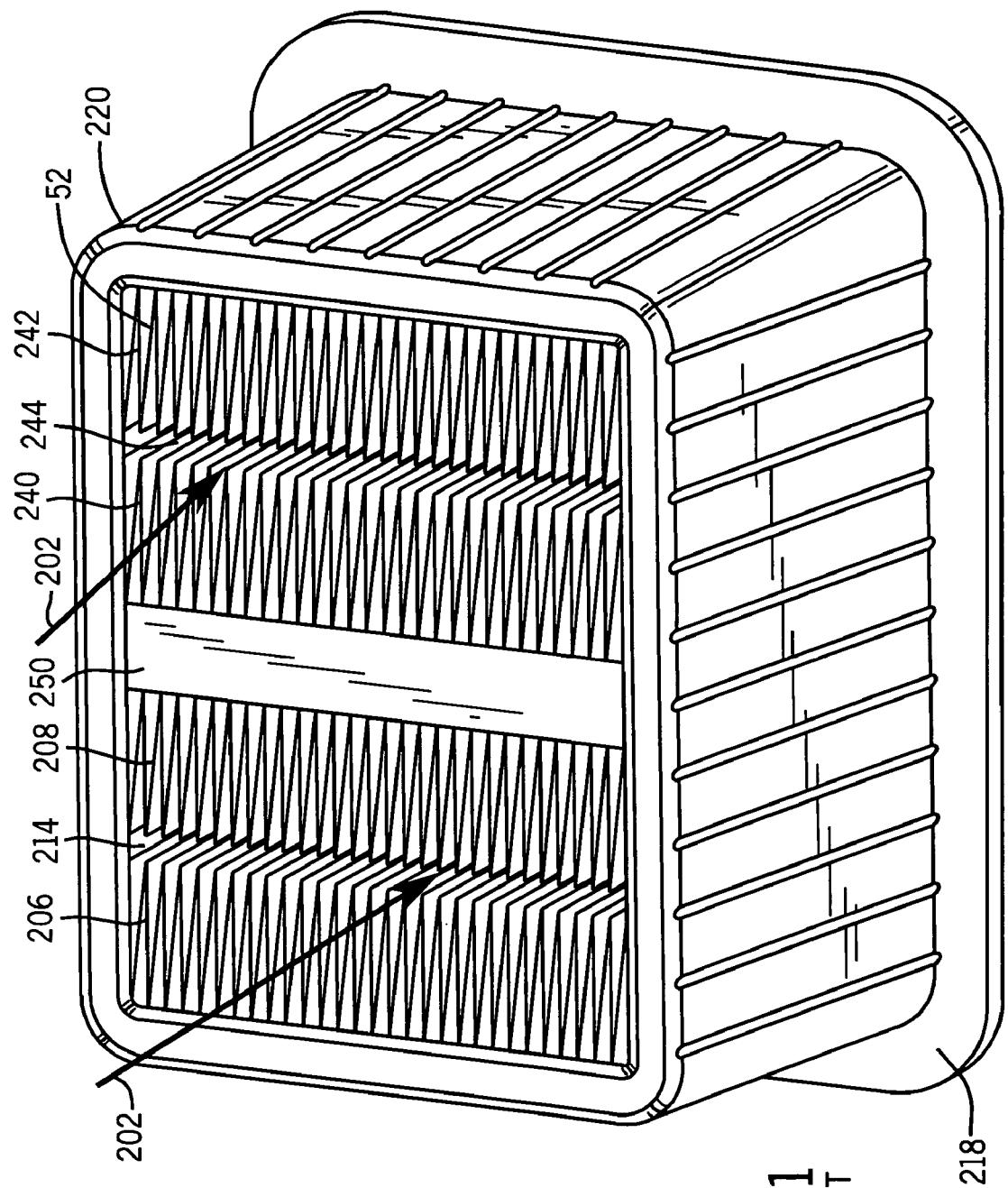
Figure 22:
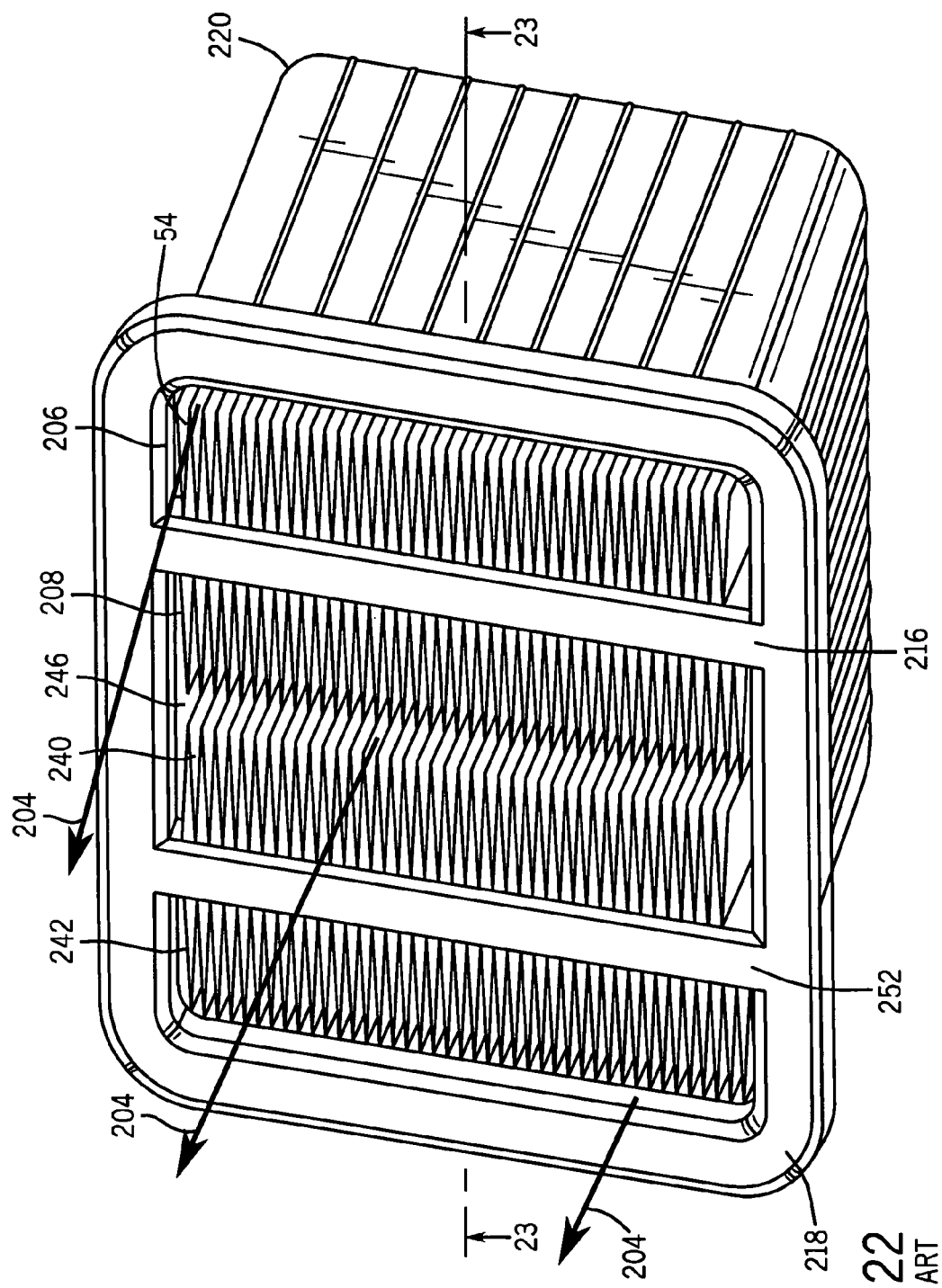

FIGS. 21-23 show a further embodiment and a use like reference numerals from above where appropriate to facilitate understanding. First, second, third and fourth panels or rows 206, 208, 240, 242 of pleated filter elements 44 are provided. Two transverse gaps 214, 244 are provided between panels at upstream end 52, and one transverse gap 246 is provided between panels at downstream end 54. An additional downstream transverse gap 236, FIG. 23, is provided between housing sidewall 228 and panel 206, and another downstream transverse gap 248 is provided between panel 242 and housing sidewall 230. Transverse gap 214 is between panels 206 and 208. Transverse gap 244 is between panels 240 and 242. Transverse gap 246 is between panels 208 and 240. The transverse gap between panels 208 and 240 at upstream end 52 is closed and blocked at the upstream end by sealing strip 250 which may be part of the upstream end of the filter housing. The gap between panels 206 and 208 at downstream end 54 is blocked and closed by sealing strip 216, and the gap between panels 240 and 242 at downstream end 54 is blocked and closed by sealing strip 252, which sealing strips 216 and 252 may be part of cover flange 218 at the downstream end of the housing. Fluid flows axially through the filter as shown at arrows 72, 74, 76, FIG. 2. Fluid additionally flows through the filter, FIG. 23, as shown at arrows 222, 224, 226, as noted above, and at arrows 222a, 224a, 226a. Additional inlet flow is enabled by transverse gaps 214, 244. Additional outlet flow is enabled by transverse gaps 236, 246, 248. In a further embodiment, the flow direction may be reversed such that incoming fluid flow enters the filter at end 54 through flow channels 70 and gaps 236, 246, 248, and exits the filter at end 52 through flow channels 58 and gaps 214, 244.

Figure 24:
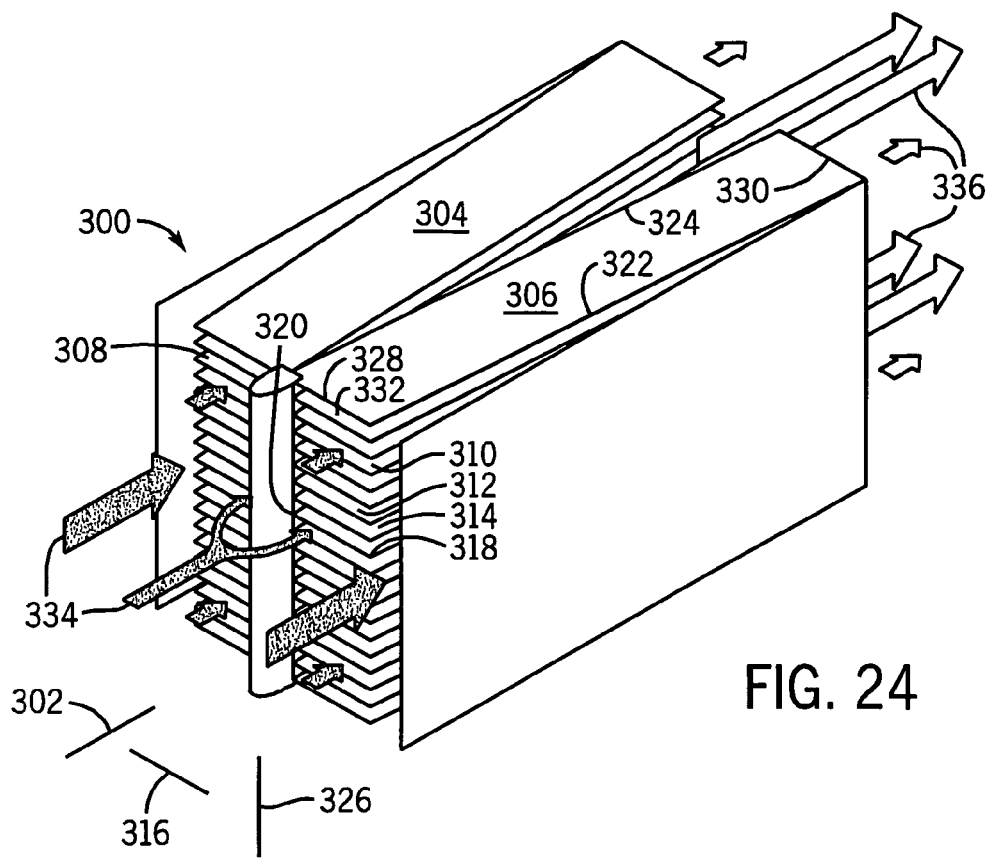
Figure 25:
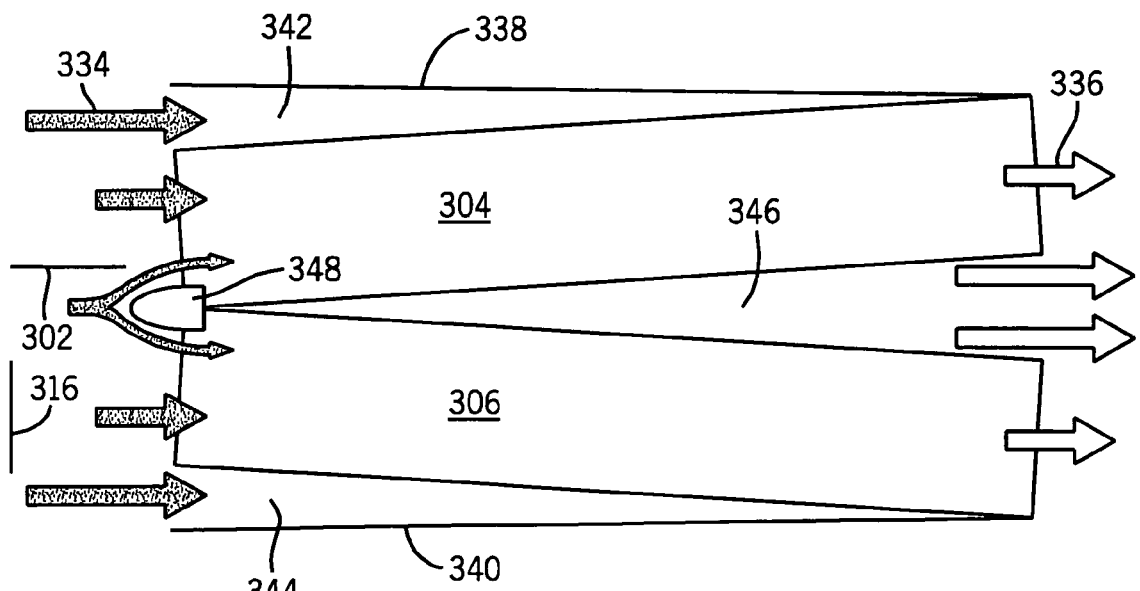
Figure 26:
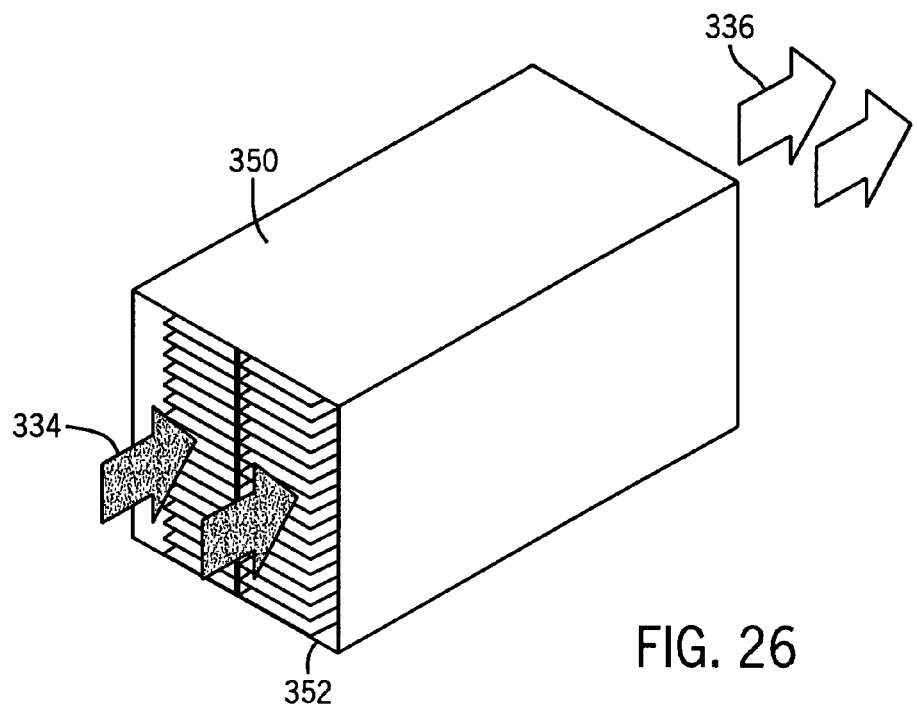

FIGS. 24-26 show a filter 300 for filtering fluid flowing along an axial flow direction 302. The filter has at least one panel, and in the embodiment of FIGS. 24-26 two panels 304, 306, each having a pleated filter element 308, 310, respectively. Each filter element has a plurality of pleats such as 312 defined by wall segments 314 extending along a transverse direction 316 between first and second sets of pleat tips 318 and 320 at first and second sets of axially extending bend lines 322 and 324. Transverse direction 316 is perpendicular to axial direction 302. Each panel extends along a lateral direction 326 perpendicular to axial direction 302 and perpendicular to transverse direction 316. Wall segments 314 extend axially between upstream and downstream ends 328 and 330. The wall segments define axial flow channels 332 therebetween, for example like channels 55 noted above in conjunction with FIG. 2. As above, the upstream ends 328 of the wall segments 314 are alternately sealed to each other, as shown at 56 in FIG. 2, to define a first set of flow channels, e.g. 58, FIG. 2, having open upstream ends 60, and a second set of flow channels, e.g. 62, FIG. 2, interdigitated with the first set of flow channels and having closed upstream ends, e.g. 64, FIG. 2. The downstream ends 330 of the wall segments 314 are alternately sealed to each other, as shown at 66 in FIG. 2, such that the first set of flow channels, e.g. 58, have closed downstream ends, e.g. 68, and the second set of flow channels, e.g. 62, have open downstream ends, e.g. 70. As above, fluid to be filtered, such as air or other fluid, flows substantially directly axially through the filter, through the open upstream ends 60 of the first set of flow channels 58 as shown at arrows 72, then through wall segments 50, FIG. 2, 314, FIG. 24, as shown at arrows 74, FIG. 2, then through open downstream ends 70 of the second set of flow channels 62 as shown at arrows 76, FIG. 2. The dirty pre-filtered air is shown at stippled arrows 334. The clean filtered air is shown at arrows 336.

Figure 18:
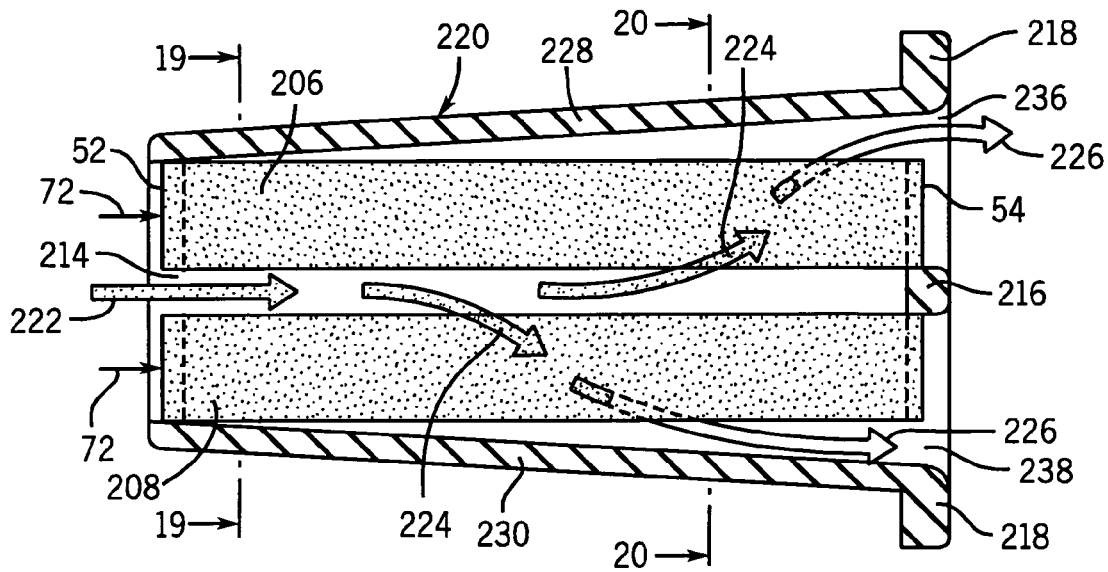
Figure 27:
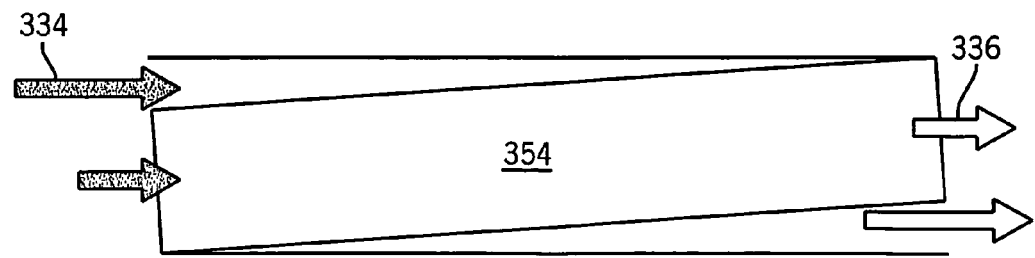

In comparing FIGS. 18 and 25, it is noted that the gaps between filter element panels 304 and 306 and between such panels and the sidewalls 338 and 340 of the housing are provided by angling the panels 304 and 306 in FIG. 25, whereas in FIG. 18 such gaps are provided by angling the housing sidewalls 228, 230. The downstream ends of housing sidewalls 338, 340 are sealed to respective filter element panels 304, 306. Gaps 342 and 344 taper to narrower transverse widths as they extend axially downstream. Gap 346 between filter element panels 304 and 306 tapers to a wider transverse width as it extends axially downstream. The upstream ends of the panels are sealed to each other at gap 346 by a sealing strip 348 extending along the noted lateral direction 326 and which may be like sealing strip 216, FIG. 18, noted above, and preferably having a leading aerodynamic shape such as a bullet nose. The top and bottom walls 350 and 352, FIG. 26 of the housing extend axially and transversely and are sealed to the upper and lower surfaces of the panels, as above, to prevent a bypass leak path. FIG. 27 shows another version with a single filter element panel 354. In each of FIGS. 24-27, and in the drawings noted below, the flow direction may be reversed, i.e. may flow from right to left, as also noted above in conjunction with FIG. 18.

Figure 28:
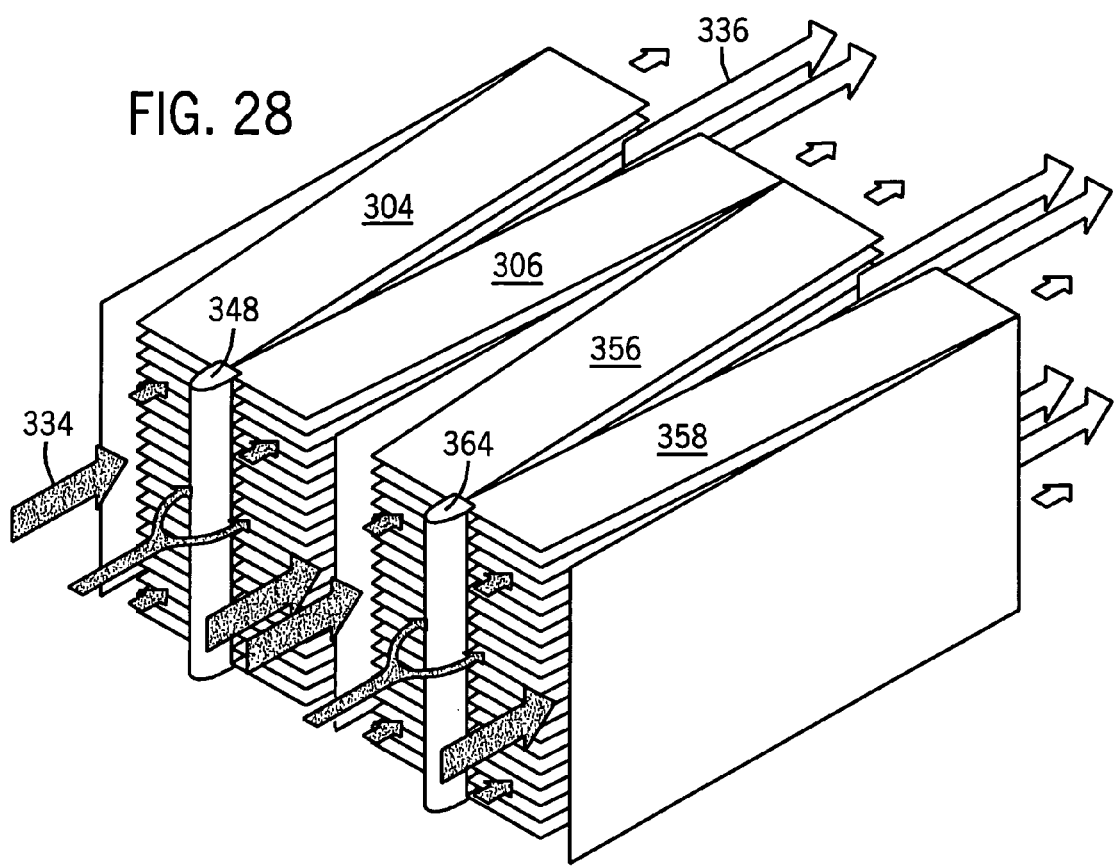
Figure 29:
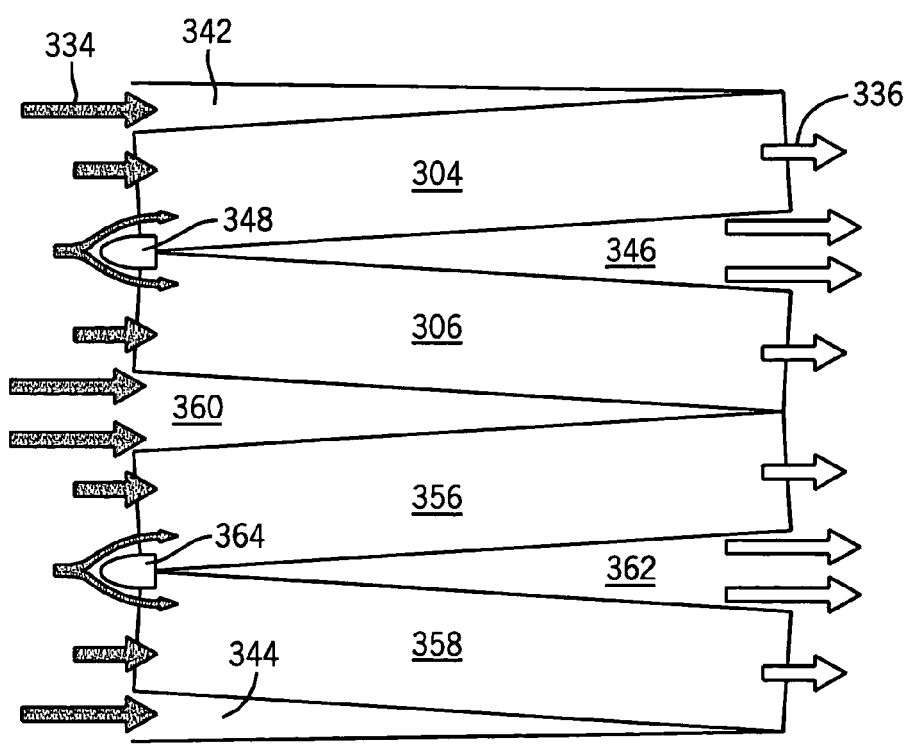

FIGS. 28 and 29 show a further embodiment and use like reference numerals from above where appropriate to facilitate understanding. The filter includes third and fourth pleated filter element panels 356 and 358, comparably to the embodiment shown above in FIGS. 21-23. Transverse gap 360 between central panels 306 and 356 is open at its upstream end and tapers to transversely narrower width as it extends axially downstream. Gaps 346 and 362 between respective panels are closed by respective upstream sealing strips 348 and 364 and taper to wider transverse widths as they extend axially downstream. Gaps 342 and 344 are open at their upstream ends and taper to narrower transverse widths as they extend axially downstream.

Figure 30:
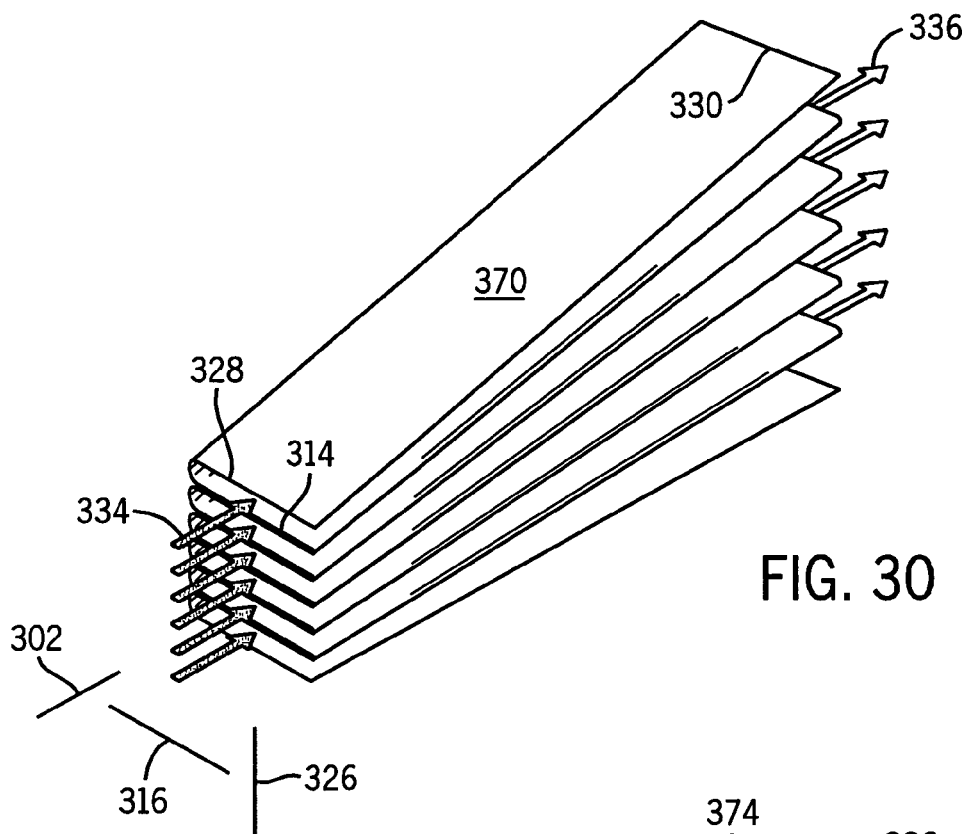
Figure 31:
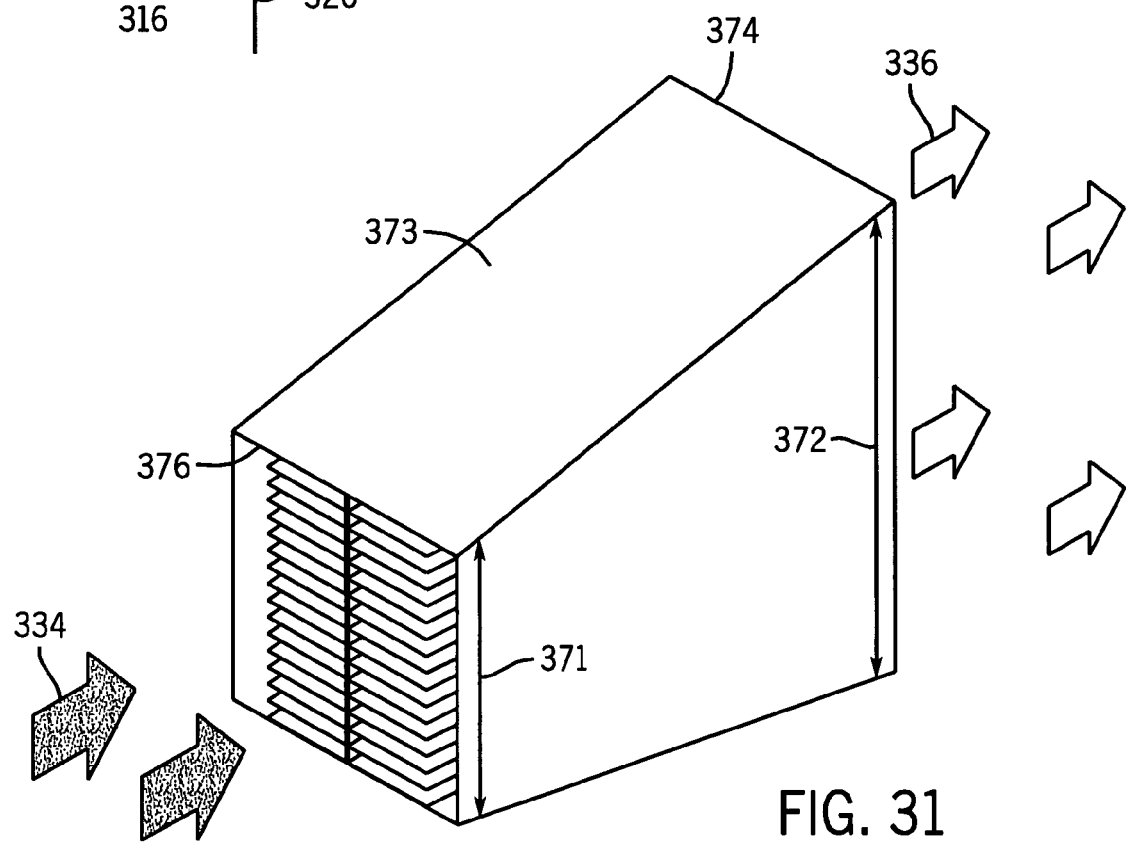

FIGS. 30 and 31 show a further embodiment and use like reference numerals from above where appropriate to facilitate understanding. Pleated filter element 370 has wall segments 314 have progressively increasing separation therebetween along lateral direction 326 as the wall segments progress axially toward one of the upstream and downstream ends 328 and 330, to provide progressively increasing flow channel width along lateral direction 326. In FIG. 30, the lateral separation between the wall segments increases as the wall segments progress axially from upstream to downstream, i.e. left to right in FIG. 30. The pleated filter element panel has an upstream width 371 along lateral direction 326 equal to the cumulative flow channel widths along lateral direction 326 thereat. The panel has a downstream width 372 along lateral direction 326 at the downstream end equal to the cumulative flow channel widths along lateral direction 326. The downstream width 372 along lateral direction 326 is greater than the upstream width 371 along lateral direction 326. Housing 373 has a concording larger exit mouth 374 then entrance mouth 376.

Figure 32:
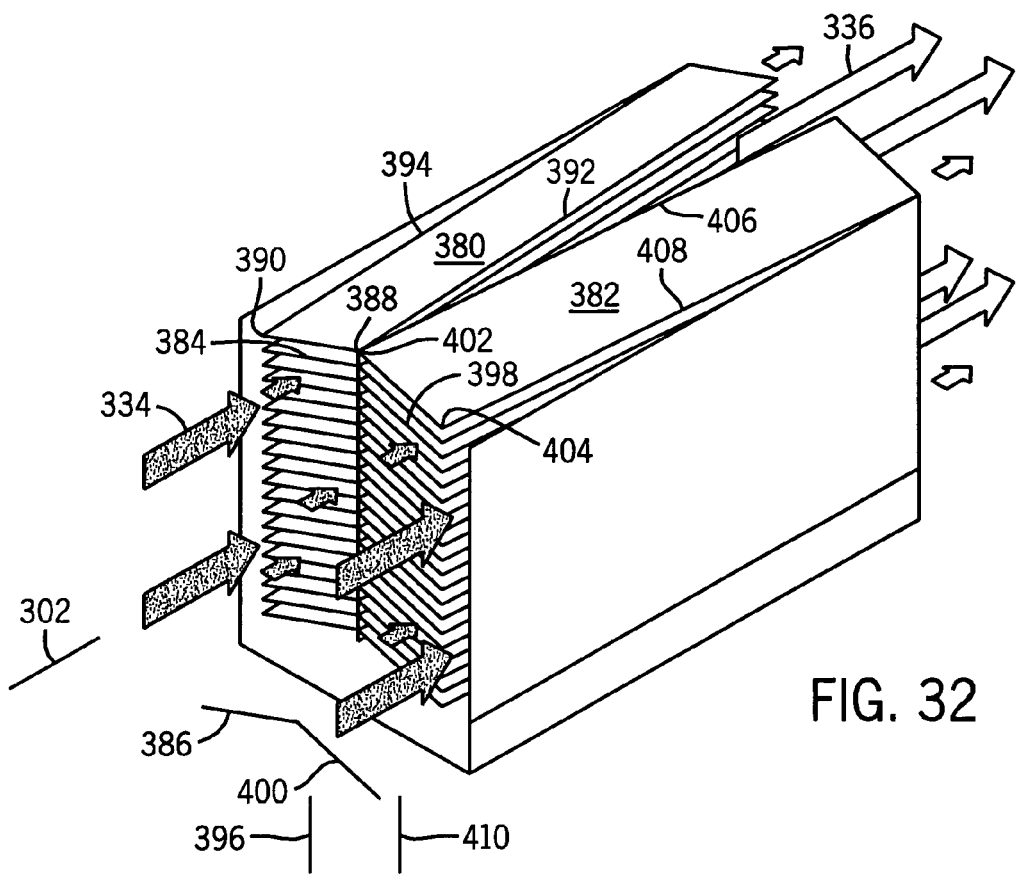
Figure 33:
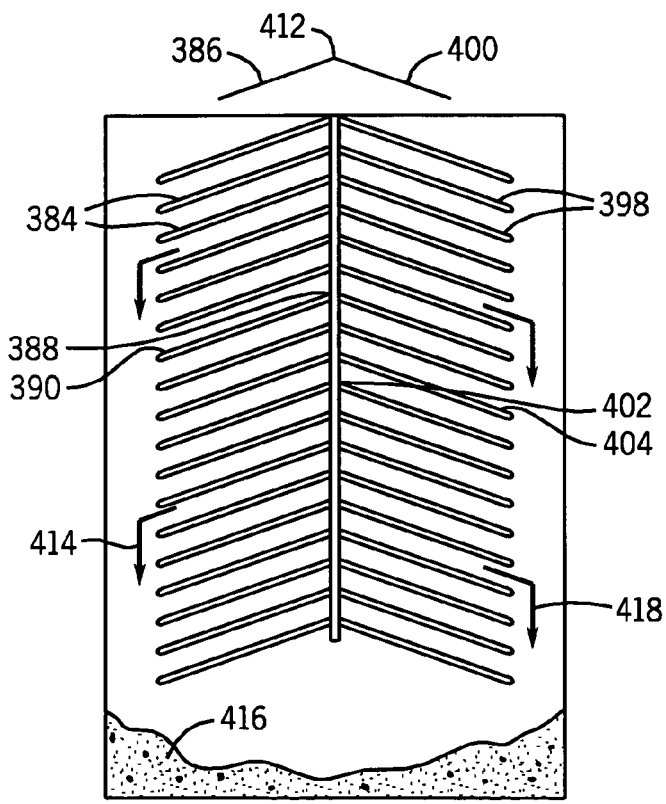

FIGS. 32 and 33 show a further embodiment and use like reference numerals from above where appropriate to facilitate understanding. The filter includes first and second panels 380 and 382 of pleated filter elements. The first filter element panel 380 has a plurality of pleats, as above described, defined by wall segments 384 extending along a first transverse direction 386 between first and second sets of pleat tips 388 and 390 at first and second sets of axially extending bend lines 392 and 394. First transverse direction 386 is perpendicular to axial direction 302. First panel 380 extends along a first lateral direction 396 perpendicular to axial direction 302 and perpendicular to first transverse direction 386. Wall segments 384 of first filter element panel 380 extend axially between upstream and downstream ends, with such wall segments defining axial flow channels therebetween, and, as above, the upstream ends of the wall segments being alternately sealed to each other to define a first set of flow channels having open upstream ends, and a second set of flow channels interdigitated with the first set of flow channels and having closed upstream ends, the downstream ends of the wall segments being alternately sealed to each other such that the first set of flow channels have closed downstream ends, and the second set of flow channels have open downstream ends, such that fluid to be filtered flows substantially directly axially through the filter element, through the open upstream ends of the first set of flow channels then through the wall segments 384 then through the open downstream ends of the second set of flow channels. Second filter element panel 382 has a plurality of pleats defined by wall segments 398 extending along a second transverse direction 400 between third and fourth sets of pleat tips 402 and 404 at third and fourth sets of axially extending bend lines 406 and 408. Second transverse direction 400 is perpendicular to axial direction 302. Second panel 382 extends along a second lateral direction 410 perpendicular to axial direction 302 and perpendicular to second transverse direction 400. Wall segments 398 of second filter element panel 382 extend axially between upstream and downstream ends, as above, the wall segments 398 defining axial flow channels therebetween, the upstream ends of wall segments 398 being alternately sealed to each other to define a third set of flow channels having open upstream ends, and a fourth set of flow channels interdigitated with the third set of flow channels and having closed upstream ends, the downstream ends of wall segments 398 being alternately sealed to each other such that the third set of flow channels have closed downstream ends, and the fourth set of flow channels have open downstream ends, such that fluid to be filtered flows substantially directly axially through filter element 382, through the open upstream ends of the third set of flow channels then through wall segments 398 then through the open downstream ends of the fourth set of flow channels.

First and second transverse directions 386 and 400, FIGS. 32, 33, extend along respective first and second skewed projection lines intersecting each other at an apex 412, FIG. 33, and forming a V-shape therefrom. The V-shape is an inverted V-shape with an upper apex 412 and a pair of sides at 386 and 400 angled downwardly therefrom. The noted pleat tips 388 of the noted first set of pleat tips are at higher vertical levels, FIG. 33, then the respective pleat tips 390 of the noted second set of pleat tips, such that wall segments 384 of first filter element 380 slant downwardly from the first set of pleat tips 388 to the second set of pleat tips 390 at an angle greater than or equal to a friction angle of removed contaminant, such that contaminant slides along such wall segments and then drops as shown at arrow 414 to the bottom of the housing as shown at collection zone 416. The noted pleat tips 402 of the noted third set of pleat tips are at higher vertical levels then respective pleat tips 404 of the noted fourth set of pleat tips such that wall segments 398 of the second filter element 382 slant downwardly from the third set of pleat tips 402 to the fourth set of pleat tips 404 at an angle greater than or equal to a friction angle of removed contaminant, such that the contaminant slides downwardly along the wall segments 398 and then falls as shown at arrow 418 to collection zone 416. First and second lateral directions 396 and 410 are preferably parallel to each other.

FIGS. 34-39 show a further embodiment and use like reference numerals from above where appropriate to facilitate understanding. Pleated filter element panel 420 has a plurality of pleats, as above, defined by wall segments 314 extending along a transverse direction 316 between first and second sets of pleat tips 318 and 320 at first and second sets of axially extending bend lines 322 and 324. Transverse direction 316 is perpendicular to axial direction 302. The panel extends along lateral direction 326 perpendicular to axial direction 302 and perpendicular to transverse direction 316. Wall segments 314 extend axially between upstream and downstream ends 328 and 330 and define axial flow channels therebetween, as above, the upstream ends of the wall segments being alternately sealed to each other, FIG. 35, as above described, to define a first set of flow channels, such as 58, FIG. 2, having open upstream ends, and a second set of flow channels such as 62 interdigitated with the first set of flow channels and having closed upstream ends, the downstream ends of the wall segments being alternately sealed to each other such that the first set of flow channels have closed downstream ends, and the second set of flow channels have open downstream ends, such that fluid to be filtered flows substantially directly axially through the filter, through the open upstream ends of the first set of flow channels then through wall segments 314 then through the open downstream ends of the second set of flow channels.

Figure 34:
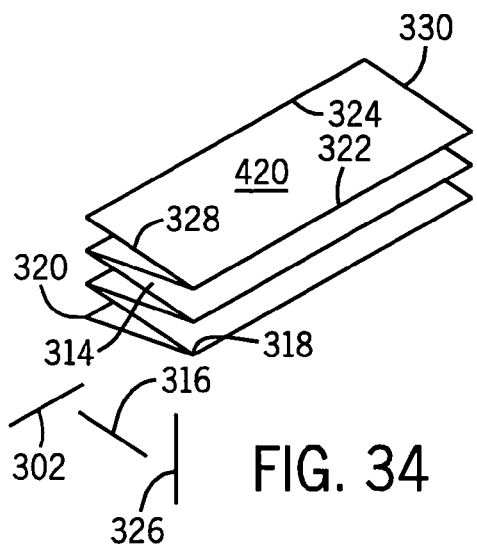
Figure 35:
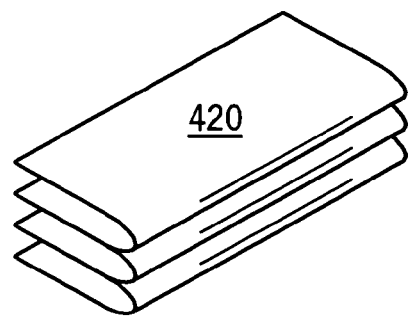
Figure 36:
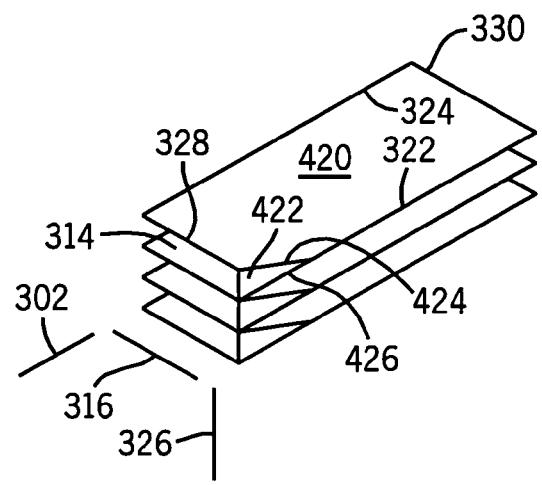
Figure 37:
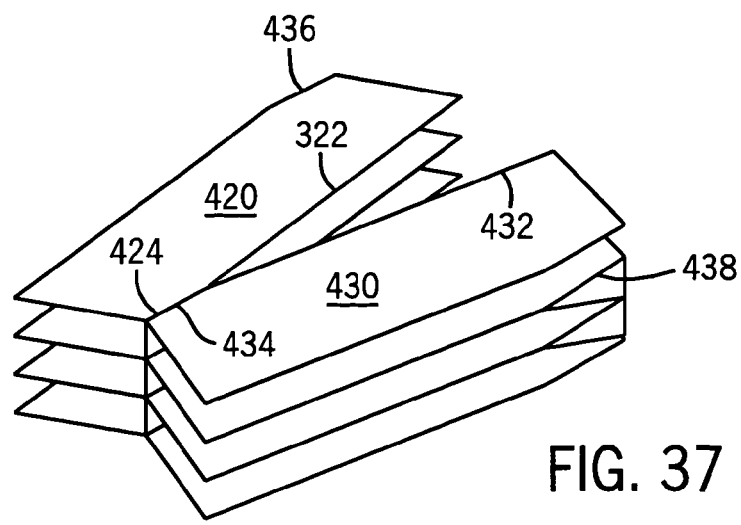
Figure 38:
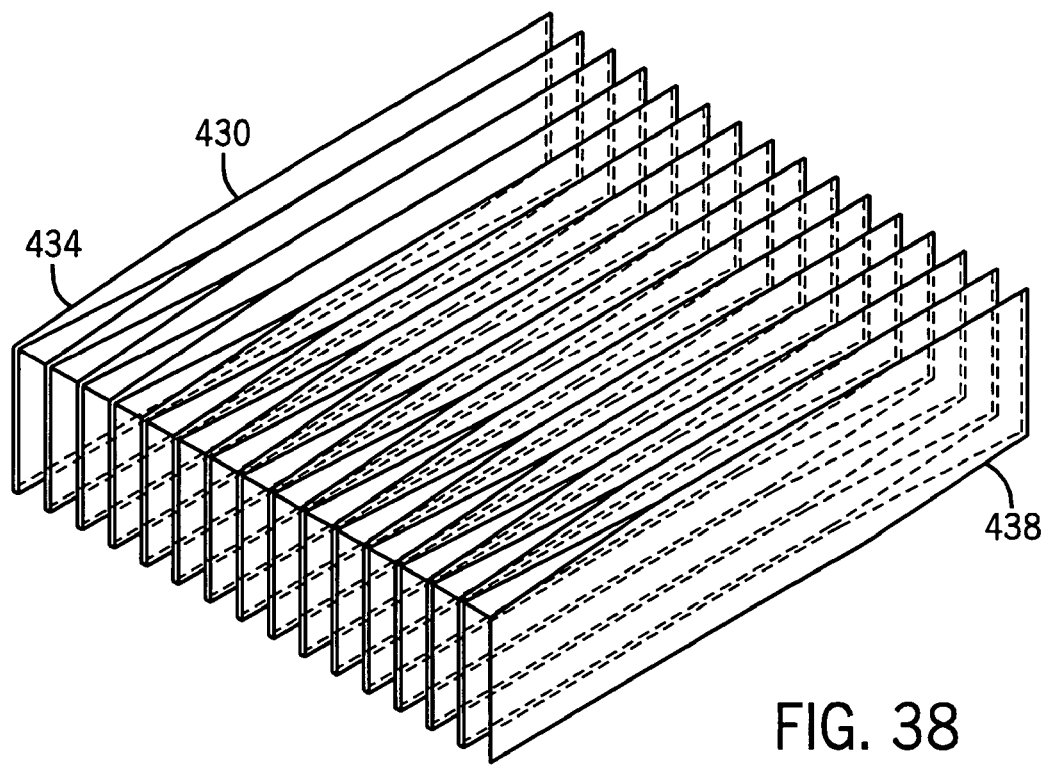
Figure 39:
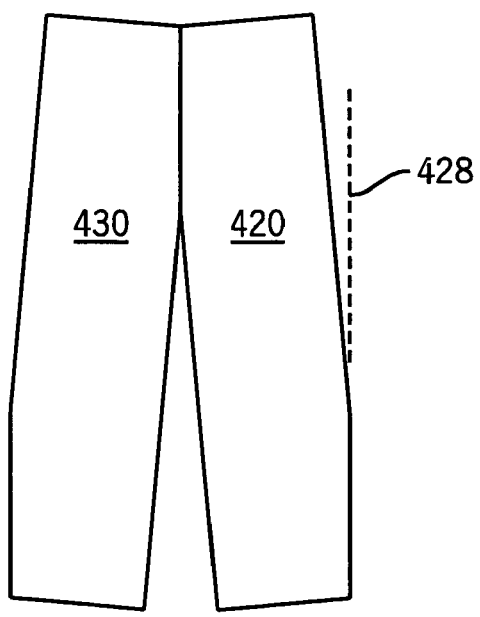

In FIG. 36, the set of pleats tips 318 of FIG. 34 along axially extending bend lines 32 at upstream end 328 are flattened at 422 transversely along transverse direction 316 into respective flow channels such that the respective axially extending bend lines 322 bifurcate in a Y-shape and branch along diverging diagonally extending bend lines 424 and 426 at upstream end 328. The wall segments have respective triangular shaped portions 422 defined by and bounded by diverging bend lines 424 and 426 of the noted Y-shape. In one embodiment, the filter is mounted in a housing having a substantially flat sidewall sealing surface as shown in dashed line at 428 in FIG. 39, and the noted triangular portions 422 of the wall segments bounded by the noted Y-shapes are substantially flat and uniplanar and mate with the noted substantially flat sidewall sealing surface 428. In other embodiments, a pair of filter element panels 420 and 430, FIG. 37, each have the noted axially extending bend lines such as 322 and 432 which bifurcate in a Y-shape and branch along the noted diverging diagonally extending bend lines such as 424 and 434 at one or both of the upstream and downstream ends. The wall segments of each of the noted pair of filter element panels 420 and 430 at one or both of the upstream and downstream ends have respective triangular shaped portions such as 422 defined and bounded by respective diverging bend lines such as 424 and 426 of the respective Y-shape, with the triangular shaped portions of respective wall segments of the pair of filter elements bounded by respective Y-shapes being substantially flat and mating with each other, for example as shown at the flat mating engagement of bend lines 424 and 434. The opposite ends, e.g. the downstream ends in FIG. 37 may also have the noted bifurcation in a Y-shape providing the noted diverging bend lines such as 436 and 438, FIGS. 37, 38, for mating with other filter element panels or an enclosing housing.

The following description of FIGS. 40-47 is taken from U.S. Pat. No. 6,511,599, FIGS. 28-35, respectively.

Figure 40:
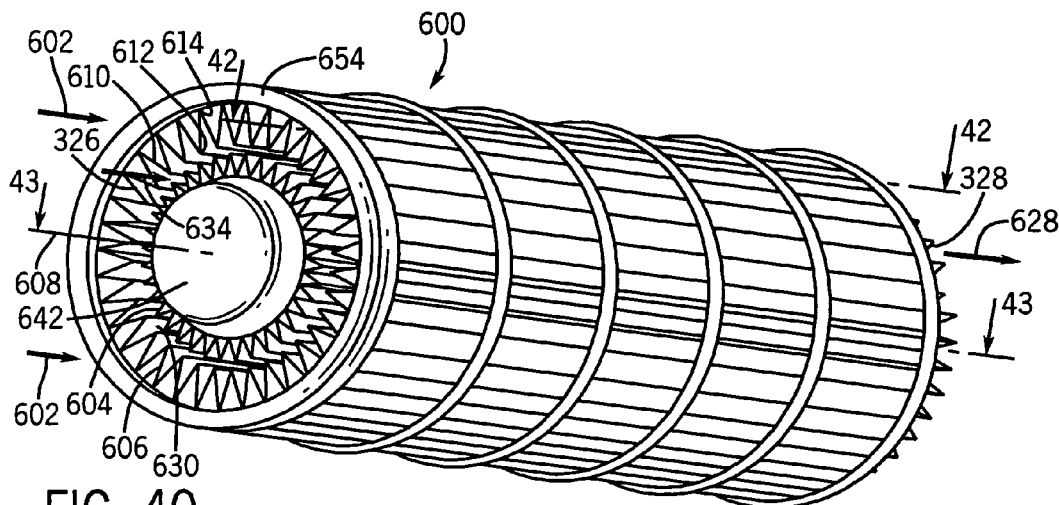
FIGS. 40-47 are taken from FIGS. 28-35, respectively, of U.S. Pat. No. 6,511,599, incorporated herein by reference.
Figure 41:
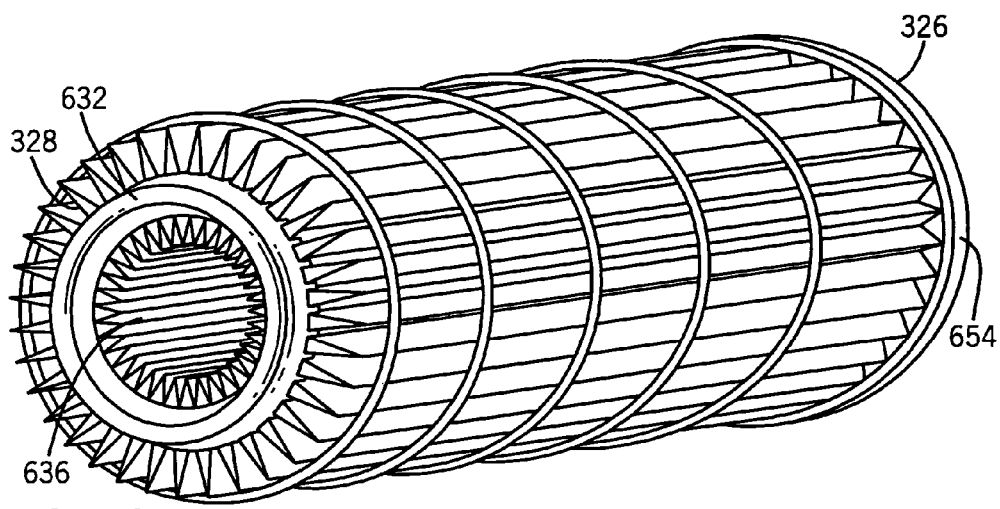
Figure 42:
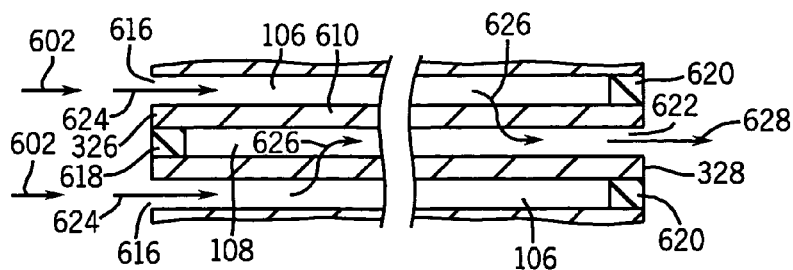
Figure 43:
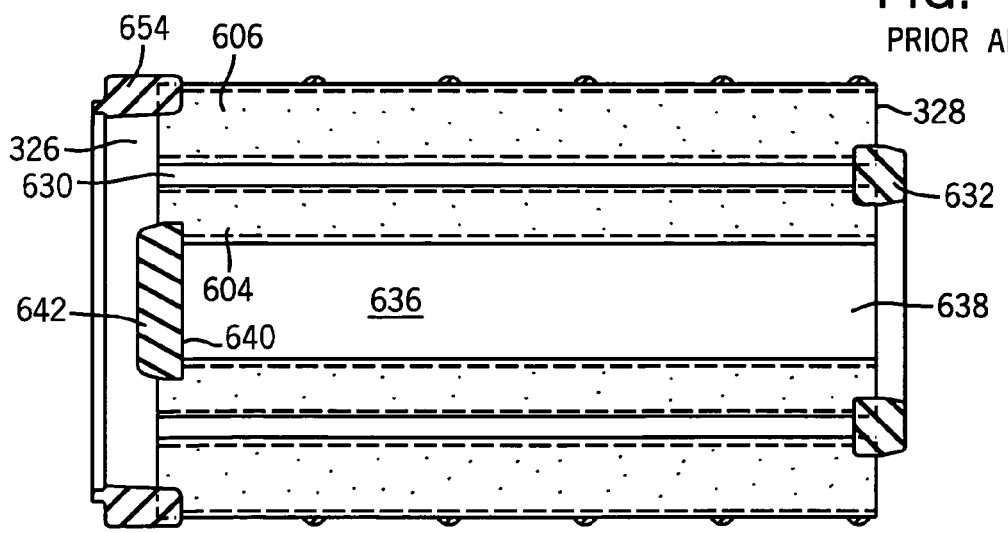

FIG. 40 shows a filter 600 for filtering fluid flowing along an axial flow direction 602. Concentric cylindrical pleated filter elements 604, 606 have a common axis 608 extending along axial flow direction 602. Each filter element has a plurality of pleats, such as 28, FIGS. 5-9 of U.S. Pat. No. 6,511,599, defined by wall segments 610 extending radially in serpentine manner between inner and outer sets of pleat tips, such as 36 and 38, respectively, at inner and outer sets of axially extending fold or bend lines 612 and 614, respectively. The wall segments extend axially between upstream and downstream ends 326 and 328. The wall segments define axial flow channels 106, 108 therebetween. Upstream ends of the wall segments are alternately sealed to each other, as above at 110, to define a first set of flow channels 106 having open upstream ends 616, FIG. 42, and a second set of flow channels 108 interdigitated with the first set of flow channels 106 and having a closed upstream ends 618. The downstream ends of the wall segments are alternately sealed to each other, as above, such that the first set of flow channels 106 have closed downstream ends 620, and the second set of flow channels 108 have open downstream ends 622. As above, fluid to be filtered flows substantially directly axially as shown at 602 through the filter, through open upstream ends 616 of the first set of flow channels 106 as shown at flow arrows 624, then through the wall segments 610 as shown at flow arrows 626, then through open downstream ends 622 of the second set of flow channels 108 as shown at flow arrow 628. The flow described thus far is like that shown in FIGS. 15 and 27 of U.S. Pat. No. 6,511,599.

Cylindrical filter elements 604 and 606 have a radial gap 630 therebetween, FIGS. 28, 31, at upstream end 326, and are sealed to each other at annular seal 632 at downstream end 328. Gap 630 provides additional axial flow therethrough as shown at flow arrow 634, FIGS. 40, 43. Filter element 606 concentrically surrounds filter element 604. Filter element 604 has a hollow interior 636, FIGS. 41, 43, having an open end 638 at downstream end 328, and having a closed end 640 at upstream end 326 closed by sealing end cap 642 comparable to end cap 342, FIG. 15 of U.S. Pat. No. 6,511,599, and end cap 514, FIG. 27 of U.S. Pat. No. 6,511,599. Open end 638 of hollow interior 636 provides additional fluid flow axially therethrough, as shown at flow arrows 644, 646, FIG. 44.

Figure 44:
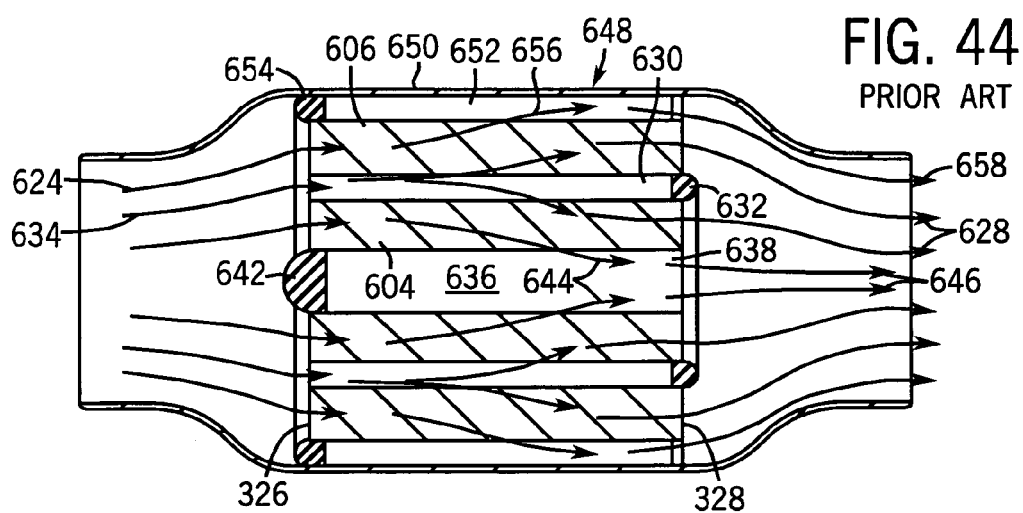
Figure 45:
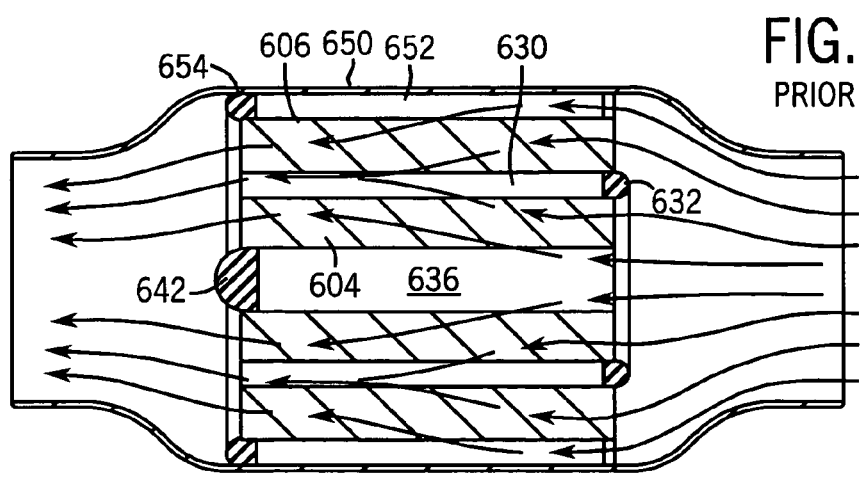

Filter 600 is mounted in a housing 648, FIG. 44, having an axially extending sidewall 650 spaced radially outwardly of filter element 606 by a radial gap 652 at downstream end 328. Sidewall 650 and filter element 606 are sealed to each other at upstream end 326 by annular seal 654. Gap 652 provides additional fluid flow axially therethrough as shown at flow arrows 656, 658. Seals 642 and 654 are at upstream end 326, and seal 632 is at downstream end 328. Seal 642 is a central seal closing hollow interior 636. Seal 632 is an annular seal concentrically surrounding filter element 604 and closing gap 630 at downstream end 328 by sealing filter elements 604 and 606 to each other. Seal 654 is an annular seal concentrically surrounding filter element 606 and closing gap 652 at upstream end 326 by sealing filter element 606 and sidewall 650 to each other. In a further embodiment, the flow direction may be reversed, as shown in FIG. 45.

Figure 46:
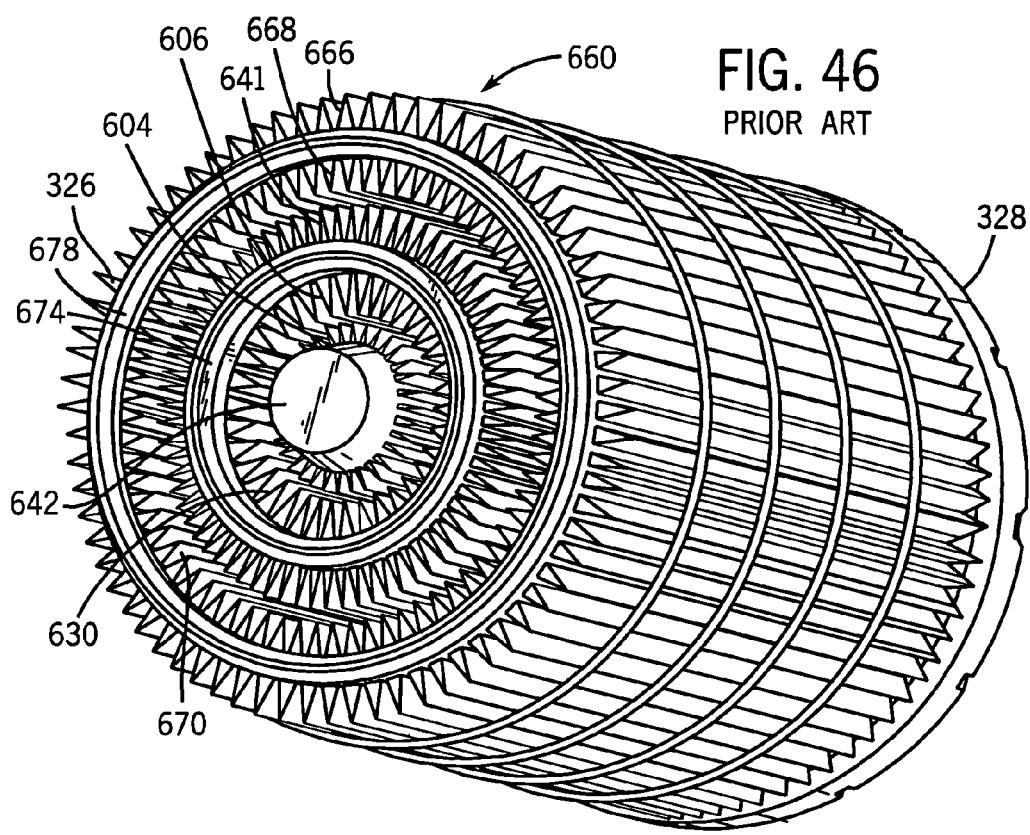
Figure 47:
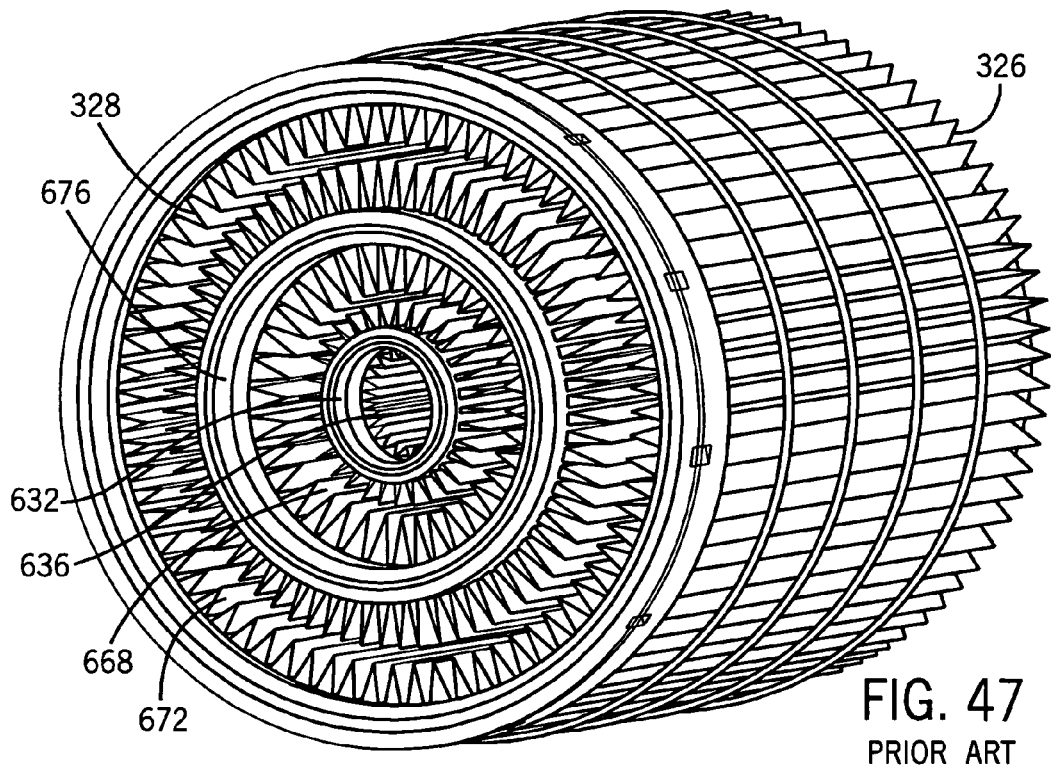

FIGS. 46 and 47 show a further embodiment and use like reference numerals from above where appropriate to facilitate understanding. Filter 660 has a plurality of concentric cylindrical filter elements 604, 606, 662, 664, 666 having respective radial gaps 630, 668, 670, 672 therebetween. Radial gaps 630 and 670 are at upstream end 326. Radial gaps 668 and 672 are at downstream end 328. Filter element 662 concentrically surrounds filter element 606. Filter elements 606 and 662 have annular radial gap 668 therebetween at downstream end 328. Radial gap 668 provides additional flow axially therethrough. Filter element 664 concentrically surrounds filter element 662. Filter elements 662 and 664 have annular radial gap 670 therebetween at upstream end 326. Radial gap 670 provides additional flow axially therethrough. Filter element 666 concentrically surrounds filter element 664. Filter elements 664 and 666 have annular radial gap 672 therebetween at downstream end 328. Radial gap 672 provides additional flow axially therethrough. Filter elements 606 and 662 are sealed to each other at annular sealing ring 674 at upstream end 326. Filter elements 662 and 664 are sealed to each other at annular sealing ring 676 at downstream end 328. Filter elements 664 and 666 are sealed to each other at annular sealing ring 678 at upstream end 326.

Present Application

FIGS. 48-50 show a filter 700 including a plurality of pleated filter elements 702, 704, 706 pleated along axially extending bend lines such as 708 to form axially extending channels such as 710 extending axially along an axial direction 712 from an upstream end 714 to a downstream end 716. Each channel has a pleat height or a channel height such as 718 extending transversely along a transverse direction 720 perpendicular to axial direction 712. Each channel has a channel width such as 722 extending laterally along a lateral direction 724 perpendicular to transverse direction 720 and perpendicular to axial direction 712. In FIG. 50, lateral direction 724 is into the page. The channels are alternately sealed at their upstream and downstream ends, as above, to provide a first set of channels open at their upstream ends and closed at their downstream ends, and a second set of flow channels closed at their upstream ends and open at their downstream ends.

First and second filter elements 702 and 704 have a first transverse gap 726 therebetween at one of the upstream and downstream ends, for example at upstream end 714 in FIG. 50, and are sealed to each other by a seal such as 728 at the other of the upstream and downstream ends, for example downstream end 716 in FIG. 50. First gap 726 provides additional fluid flow axially therethrough, as above. Second and third filter elements 704 and 706 have a second transverse gap 730 therebetween at the other of the upstream and downstream ends, for example downstream end 716 in FIG. 50, and are sealed to each other by a seal 732 at the noted one of the upstream and downstream ends, for example upstream 714 in FIG. 50. Second gap 730 provides additional fluid flow axially therethrough, as above.

The pleat channel height of at least one of the filter elements is different than the pleat channel height of at least one of the other filter elements, and preferably is different than the pleat channel height of each of the other filter elements, and further preferably the pleat channel height of each of the filter elements is different than the pleat channel height of each of the other filter elements. In FIGS. 48-50, the filter elements are concentric annuli. Third filter element 706 surrounds second filter element 704 and has a channel height 718 greater than the channel height 734 of the second filter element. Second filter element 704 surrounds first filter element 702 and has a channel height 734 greater than the channel height 736 of the first filter element. The filter elements are housed in a housing 738. An annular spacer ring 740 extends transversely between the housing and outer filter element 706. The spacer ring is at one of the upstream and downstream ends, for example at upstream end 714 in FIGS. 49, 50, and the transverse gap 742 between housing 738 and outer filter element 706 is sealed by a seal 744 at the other of the upstream and downstream ends, for example at downstream end 716 in FIG. 50. Spacer ring 740 passes fluid flow axially therethrough. Center gap 746 in the interior of the central filter element 702 is sealed by seal 748. Fluid may flow axially from end 714 to end 716, which is left to right in FIGS. 48 and 49, and upwardly in FIG. 50. Alternatively, in a reverse flow filter, the fluid may flow in the opposite direction, namely from end 716 to end 714, which is right to left in FIGS. 48 and 49, and downwardly in FIG. 51.

The noted concentric annuli have a shape selected from the group consisting of a circular shape, for example as shown in FIGS. 48-50, an oval shape, a racetrack shape, for example as shown in FIGS. 52, 53, an obround shape, and other closed-loop shapes. As used herein, annular includes all of these shapes. FIGS. 52, 53 show annular racetrack shaped filter elements 750, 752, 754 having the noted differing pleat channel heights 736, 734, 718, respectively, and housed in a housing 756 having a spacer ring 758. FIG. 54 shows another embodiment having a first filter element 760, which may be rectangular, and a second surrounding filter element 762, which filter elements have different pleat channel heights.

As above, the filter elements may be angled with respect to each other, for example as shown in FIG. 55 at angled filter elements 764 and 766 in filter housing 768 angled with respect to each other as they extend axially from upstream end 770 to downstream end 772 to provide transverse gap 774 therebetween of changing transverse width. Gap 774 tapers from a first transverse width such as 776 at one of the upstream and downstream ends, for example upstream end 770, to a second transverse width such as 778 at the other of the upstream and downstream ends, for example downstream end 772. One of the first and second transverse widths is greater than the other, for example second transverse width 778 is greater than first transverse width 776. One of such transverse widths is sealed by a sealing member such as 780 extending transversely between the first and second filter elements 764 and 766. Fluid may flow axially left to right from end 770 to end 772 as shown in FIG. 55, or alternatively fluid may flow in the opposite axial direction as shown in FIG. 56 from right to left from end 772 to end 770.

Also as above, at least some of the noted axially extending bend lines 708 along a portion thereof at at least one of the upstream and downstream ends may be flattened transversely, e.g. at 422, FIG. 36, along the noted transverse direction into respective channels such that the respective axially extending bend lines bifurcate in a Y-shape and branch along diverging diagonally extending bend lines, e.g. 424 and 426, at at least one of the upstream and downstream ends. The filter elements may thus have at one or both of the upstream and downstream ends respective triangular shaped portions defined by and bounded by diverging bend lines of Y-shapes. The filter is mounted in a housing having a sidewall sealing surface, which housing sidewall may be curved as in FIG. 49, or have curved portions and flat rectilinear portions as in FIG. 53. The noted triangular portions bounded by Y-shapes mate with the noted sidewall sealing surface. Each of multiple filter elements may have the noted axially extending bend lines which bifurcate in a Y-shape and branch along diverging diagonally extending bend lines at one or both of the upstream and downstream ends, and each of such multiple filter elements at a respective one of the upstream and downstream ends may have respective triangular shaped portions defined by and bounded by respective diverging bend lines of the Y-shapes, which triangular shaped portions of the multiple filter elements bounded by respective Y-shapes mate with each other.

The disclosed constructions enable optimum pleat spacing, achieving a maximum media utilization coefficient. Furthermore, the contaminant will not clog the filter inlet because there are allowable contaminant passages such as 726, 742 between the coupled filtration units. The contaminant accumulation on the inlet face is reduced. Thus, the contaminant cake is distributed more uniformly along the entire filter element axial length. Because of the uniform contaminant mass distribution, filter pressure drop decreases, and filter life increases. The high filter media utilization factor, reduced pressure drop, and long life, are achieved in a reduced volume filter housing. The noted spacers such as 740, 758 may be a separate piece, or may be attached directly to the filter, or may be integrated into an inlet duct. Filter position may also be secured using hotmelt beads or other plastic or metal members. The housing such as 738, 756 may be metal or plastic. If desired, handles such as 790, 792 may be formed with or attached to the filter element, to assist in filter servicing, e.g. by grabbing the handle and pulling the multi-element filter unit axially leftwardly in FIGS. 49, 53 out of the respective housing 738, 756. The multi-element filter units may have an odd number of filter elements, e.g. three elements as in FIGS. 48-53, or may have an even number of filter elements, e.g. two elements as in FIGS. 54-56, or four elements, etc. The transverse space or gap between the layers or elements, e.g. gaps 746, 726, 730, 742, 774, may be modified so that there are larger or smaller gaps depending upon the particular customer's restriction and capacity requirements. For example, a design can utilize a larger gap for customers who don't require large dust-holding capacity, but do require low restriction in a particular package size. These large gaps between pleat blocks or filter elements would occupy space that would otherwise be used for media area, but they would result in lower system restriction and would meet a low dust-holding capacity requirement. The seals between elements, e.g. 732, 780 may have a bullet-shape to decrease flow restriction. The combined filter element unit may be sealed to the housing by an outer seal such as 744 by an axial and/or radial sealing force. Air cleaner applications are a desirable implementation of the disclosed constructions. Coalescer applications are also a desirable implementation, and it is an advantage that the lowest velocity is farthest from the entrance to the filter and at the point where the release and drainage of captured droplets occurs. This low velocity minimizes break-up of drops upon their release. In some applications, it may be desirable to reverse the flow and provide increasing velocity with distance from the filter entrance, which may be an advantage when diffusion and/or interception are the dominant capture mechanisms, and there are few large dense impacted particles to collect at the filter inlet. Various types of filter media may be used for the pleated filter elements, as is known.

It is recognized that various equivalents, alternatives and modifications are possible within the scope of the appended claims. The above principles are applicable to various annular filters of various closed-loop shapes, and are also applicable to panel filters having stacked multiple filter elements.

What is claimed is:

1. A filter comprising a plurality of pleated filter elements pleated along axially extending bend lines to form axially extending channels extending axially along an axial direction from an upstream end to a downstream end, each channel having a channel height extending transversely along a transverse direction perpendicular to said axial direction, each channel having a channel width extending laterally along a lateral direction perpendicular to said transverse direction and perpendicular to said axial direction, said channels being alternately sealed at said upstream and downstream ends to provide a first set of flow channels open at their upstream ends and closed at their downstream ends, and a second set of flow channels closed at their upstream ends and open at their downstream ends, a first and a second of said filter elements having a transverse gap therebetween at one of said upstream and downstream ends, and being sealed to each other at the other of said upstream and downstream ends, said gap providing additional fluid flow axially therethrough, the channel height of said first filter element being different than the channel height of said second filter element, wherein said first and second filter elements are angled with respect to each other as they extend axially from upstream to downstream to provide said transverse gap therebetween of changing transverse width, and wherein said gap tapers from a first transverse width at said one of said upstream and downstream ends to a second transverse width at the other of said upstream and downstream ends, one of said first and second transverse widths being greater than the other of said first and second transverse widths.

2. The filter according to claim 1 wherein one of said first and second transverse widths is sealed by a sealing member extending transversely between said first and second filter elements.

3. A filter comprising a plurality of pleated filter elements pleated along axially extending bend lines to form axially extending channels extending axially along an axial direction from an upstream end to a downstream end, each channel having a channel height extending transversely along a transverse direction perpendicular to said axial direction, each channel having a channel width extending laterally along a lateral direction perpendicular to said transverse direction and perpendicular to said axial direction, said channels being alternately sealed at said upstream and downstream ends to provide a first set of flow channels open at their upstream ends and closed at their downstream ends, and a second set of flow channels closed at their upstream ends and open at their downstream ends, a first and a second of said filter elements having a transverse gap therebetween at one of said upstream and downstream ends, and being sealed to each other at the other of said upstream and downstream ends, said gap providing additional fluid flow axially therethrough, the channel height of said first filter element being different than the channel height of said second filter element, wherein at least some of said axially extending bend lines along a portion thereof at at least one of said upstream and downstream ends are flattened transversely along said transverse direction into respective said channels such that the respective axially extending bend lines bifurcate in a Y-shape and branch along diverging diagonally extending bend lines at said one of said upstream and downstream ends.

4. The filter according to claim 3 wherein said filter elements at said one of said upstream and downstream ends have respective triangular shaped portions defined by and bounded by diverging bend lines of said Y-shapes.

5. The filter according to claim 4 wherein said filter is mounted in a housing having a sidewall sealing surface, and said triangular portions bounded by said Y-shapes mate with said sidewall sealing surface.

6. The filter according to claim 4 wherein said first and second filter elements each have said axially extending bend lines which bifurcate in a Y-shape and branch along diverging diagonally extending bend lines at one of said upstream and downstream ends, each of said first and second filter elements at said one of said upstream and downstream ends having respective triangular shaped portions defined by and bounded by respective said diverging bend lines of said Y-shapes, said triangular shaped portions of said first and second filter elments bounded by respective said Y-shapes mating with each other.

* * * * *